US009830659B2

(12) United States Patent
Santner et al.

(10) Patent No.: US 9,830,659 B2
(45) Date of Patent: Nov. 28, 2017

(54) METHOD AND SYSTEM FOR DETERMINING AN OPTIMUM PLAN FOR RETIREMENT INCOME

(71) Applicant: RETIREUP, INC., Libertyville, IL (US)

(72) Inventors: Daniel Santner, Mundelein, IL (US); Jeffrey P. Feinendegen, Mundelein, IL (US)

(73) Assignee: RETIREUP, INC., Libertyville, IL (US)

( * ) Notice: Subject to any disclaimer, the term of this patent is extended or adjusted under 35 U.S.C. 154(b) by 461 days.

(21) Appl. No.: 14/504,877

(22) Filed: Oct. 2, 2014

(65) Prior Publication Data

US 2015/0095265 A1    Apr. 2, 2015

Related U.S. Application Data

(60) Provisional application No. 61/885,576, filed on Oct. 2, 2013.

(51) Int. Cl.
*G06Q 40/00*     (2012.01)
*G06Q 40/06*     (2012.01)

(52) U.S. Cl.
CPC .................. *G06Q 40/06* (2013.01)

(58) Field of Classification Search
CPC ......... G06Q 40/00; G06Q 40/04; G06Q 40/06
See application file for complete search history.

(56) References Cited

U.S. PATENT DOCUMENTS 6,411,939 B1 * 6/2002 Parsons ............. G06Q 10/0635
                                                  705/35
8,341,063 B1 * 12/2012 Cernyar ................. G06Q 40/06
                                                  705/35

(Continued)

OTHER PUBLICATIONS

Social Security Explorer, Claim Chart, 24 pages with screen shots, Jun. 14, 2012, Impact Technologies Group, Inc, Charlotte, North Carolina.†

(Continued)

*Primary Examiner* — Lalita M Hamilton
(74) *Attorney, Agent, or Firm* — Marshall, Gerstein & Borun LLP; Randall G. Rueth

(57) ABSTRACT

The method, system, and computer-readable medium generate and adjust retirement plans. Client information and projection parameters are received from a user and used to generate a first retirement plan. Default values for some information may be presented to verification based upon previously entered information. The first retirement plan is presented to the user simultaneously with a plurality of options to adjust the parameters, which are presented such that the user may adjust the parameters without obscuring the retirement plan information. Upon selection of an option by the user, the retirement plan is adjusted and presented in real-time, which may be implemented by the user's computer without communication with another computer. A reallocation option may be included to request quotes from additional parties, receive the quotes, and reallocate part or all of the value of a client asset to a different type of asset based upon the quotes.

20 Claims, 21 Drawing Sheets

(56) References Cited

U.S. PATENT DOCUMENTS

| | | | | |
|---|---|---|---|---|
| 2002/0188536 A1* | 12/2002 | Milosavljevic | ........ | G06Q 40/00 705/35 |
| 2003/0028466 A1* | 2/2003 | Jenson | ................... | G06Q 40/00 705/36 R |
| 2005/0144108 A1* | 6/2005 | Loeper | ................... | G06Q 40/00 705/36 R |
| 2007/0038542 A1* | 2/2007 | Armstrong | ............. | G06Q 40/06 705/36 R |
| 2012/0259797 A1* | 10/2012 | Sarkany | ................. | G06Q 40/06 705/36 R |
| 2013/0198111 A1* | 8/2013 | Dicastri | ................. | G06Q 40/06 705/36 R |
| 2014/0032445 A1† | 1/2014 | Smith | | |

OTHER PUBLICATIONS

Impact's Retirement Road Map, Claim Chart 24 pages with screen shots, Nov. 18, 2005, Impact Technologies Group, Inc., Charlotte, North Carolina.†

\* cited by examiner
† cited by third party

Create Customer Goal                                         x

| | |
|---:|:---|
| Type | [ Assisted Living ▼ ] |
| Description | [ Assisted Living Expenses ] |
| Yearly Expense | [ $35,000 ] [ In Current Dollars ▼ ] inflates [ 2.5 ] % annualy |
| Expense Period | [ Once a Year ▼ ] |
| Start At | ● Age [ 90 ]  Year: 2049 |
| | ○ Year |
| | ○ Retirement |
| | *Choose this option if you want the start date to automatically follow any retirement date changes made on the retirement plan.* |
| Stop At | ○ Age |
| | ○ Year |
| | ● Never |
| Funding | ○ Before Retirement salary will fund this goal. |

[CANCEL] [SAVE]

*FIG. 4*

METHOD AND SYSTEM FOR DETERMINING AN OPTIMUM PLAN FOR RETIREMENT INCOME

CROSS-REFERENCE TO RELATED APPLICATIONS

This application claims the benefit of U.S. Provisional Application No. 61/885,576, filed Oct. 2, 2013, the entirety of which is incorporated by reference herein.

TECHNICAL FIELD

The present disclosure generally relates to a system and a method for managing and evaluating financial retirement portfolios to generate optimum returns during a retiree's lifetime, along with investment rules and strategies to manage retirement portfolios.

BACKGROUND

Many individuals begin planning for retirement well in advance. Such planning frequently includes planning for the financial impact of the elimination of employment income and the addition of income from other sources, such as pensions or Social Security benefits. This financial planning also typically includes saving and investment decisions, as well as estimates of income required or desired during retirement. The decision of when a person should retire is also a key factor in retirement planning. This decision is generally a function of at least four major factors: (1) the amount of income a person needs or desires to draw in his retirement; (2) when that person will retire; (3) how much that person is able to save for retirement; and (4) how retirement funds are invested. Individuals have no control over the performance of financial markets, and the fourth factor is generally a hit-or-miss estimate based on a person's relative propensity for risk or security in his retirement investment portfolio. However, the myriad of investment choices and the relative safety or risk they present generally focus a financial planner's efforts on this fourth factor, with little or no attention given to the effects of the first three factors over which individuals have significantly greater control.

Generally, a financial planner will start to formulate a retirement plan with a questionnaire that establishes narrow parameters for the first three factors. The planner then focuses on the fourth factor to develop a financial retirement plan that serves the potential retiree's responses to the first three factors. Although even minor changes to any one of the first three factors can materially affect the assumptions inherent in the fourth factor, planners generally will not develop a plurality of plans that respond to those types of changes. When a plurality of plans are developed, they are limited to a few scenarios (e.g., three different retirement ages or high and low market performance levels).

Financial planners frequently utilize software tools to formulate retirement plans for their clients. As with other aspects of the typical retirement planning process, these tools focus on the fourth major retirement planning factor, namely, the mix of assets in a prospective retiree's account. Few, if any of the existing software tools facilitate changes to the other major factors that may affect a retiree's income. Instead, these prior art planning tools will include static entry fields for the retiree's desired income, projected retirement age, and current savings, which will then be used to devise a sampling of plans based upon those static factors. If the client wishes to change any of those other factors, the planner will need to run separate scenarios, each of which is based on different input factors. The client will then be presented with a plethora of static projections and will have little or no opportunity to see how those projections may change with changes to the other input factors. If the client requests additional information on how a change (such as buying a vacation home) may impact the projections, the financial planner must go through a time-consuming process of creating a new set of projections by entering the information for a new scenario into the software tool.

When financial planners attempt to develop more complex retirement plans, the time and effort required to produce new projections of different scenarios increases. For example, considering risk protection mechanisms and factoring in regular withdrawals may require producing multiple sets of projects for each scenario adjustment. Few existing software tools allow a financial planner the flexibility to vary multiple primary and secondary parameters in response to a client inquiry, and even those tools lack the capability to generate real-time projections or projection summaries to present to a client in response to changes in the parameters. The ability to generate and display "what if" scenarios in real-time for a sliding scale of changes and assumptions (e.g., postponing retirement by various lengths of time, increasing savings by various amounts prior to retirement, or adjusting life expectancy) is not available in existing retirement planning tools.

SUMMARY

A method, system, and computer-readable medium storing instructions for generating and adjusting retirement plans for a client are disclosed herein. One embodiment comprises a computer-implemented method including: receiving client information (including information related to at least a plurality of parameters for projecting future values associated with the retirement plans); determining a first retirement plan based upon the received client information; presenting information regarding the first retirement plan to a user simultaneously with the information regarding the first retirement plan; presenting a plurality of options to change the parameters; receiving an indication of a parameter change (including a selection of at least one of the plurality of options to change the parameters); determining a second retirement plan based upon the client information and the indication of the parameter change; and presenting information regarding the second retirement plan to the user simultaneously with a second plurality of options to change the parameters. The pluralities of options are presented to the user simultaneously with the information regarding the retirement plans to facilitate adjustment of the retirement plan parameters by the user in real-time (i.e., without a noticeable delay between the selection by the user of an option to adjust a parameter and the presentation of the second retirement plan).

The information regarding the retirement plans may include a projection of at least one of the following: retirement income from one or more sources during retirement, expenses during retirement, retirement age, rate of return on investments, rate of return on other assets, length of client life, healthcare expenses, recurring expenses, nonrecurring expenses. The client information may include a first item of client information and a second item of client information, such that the second item is prepopulated with a default value based at least in part upon the received value of the first item. In some embodiments, this may be implemented using default values for parameters, such as an expected rate of return on equity securities in an investment account.

In some embodiments, determining the second retirement plan may include determining the second retirement plan using a computing device operated by the user without requesting or receiving additional information from any additional computing devices communicatively connected to the computing device after receiving the indication of the parameter change. By not requesting or receiving additional information from another computing device (e.g., a networked server), the second retirement plan may be determined in real-time.

In further embodiments, the plurality of options to change the parameters may include a stress test option. Selection of the stress test option may cause the second retirement plan to adjust one or more of the parameters to simulate one or more of the following market events: a single-year reduction in the rate of return on at least one asset, a multi-year reduction in the rate of return on at least one asset, a single-year reduction in the value of at least one asset, a multi-year reduction in the value of at least one asset, or a multi-year series of changes to the rate of return that includes at least one increase in the value of at least one asset and at least one decrease in the value of at least one asset. Additional options to change the parameters may further include an option to adjust the timing of the occurrence of the one or more market events. The plurality of options may also include a drawdown option that, when selected, causes the second retirement plan to include a sufficient withdrawal of an asset in each period following the client's retirement to meet the client's retirement income goals in each of one or more periods following the client's retirement until the asset is depleted. The plurality of options may also include at least one optimization option associated with one or more of the plurality of parameters that, when selected, causes an adjustment to the associated one or more parameters in the second retirement plan such that the difference between the client's retirement income goal and projected retirement income is minimized. Additional or alternative options to change the parameters may be included in various embodiments.

In still further embodiments, the indication of the parameter change may include a selection of a reallocation option to reallocate part or all of at least one asset of the assets of the client to a different type of asset in the second retirement plan. For example, the indication of the parameter change may include a selection of an option to reallocate funds from an investment account to a variable annuity. Additionally, the reallocation option may include a selection to reallocate part or all of the at least one asset of the client to an annuity, in which case the following actions may occur: a request for one or more quotes for the annuity may be transmitted to one or more parties; one or more quotes from the one or more parties may be received; and the second retirement plan may be determined based at least in part upon the received one or more quotes from the one or more parties.

Another embodiment comprises a computer system including one or more processors and a program memory storing instructions that when executed by the one or more processors cause the computer system to: receive client information (including information related to at least a plurality of parameters for projecting future values associated with the retirement plans); determine a first retirement plan based upon the received client information; present information regarding the first retirement plan to a user simultaneously with the information regarding the first retirement plan; present a plurality of options to change the parameters; receive an indication of a parameter change (including a selection of at least one of the plurality of options to change the parameters); determine a second retirement plan based upon the client information and the indication of the parameter change; and present information regarding the second retirement plan to the user simultaneously with a second plurality of options to change the parameters. Yet another embodiment comprises a tangible, non-transitory computer-readable medium storing instructions that when executed by one or more processors of a computer system cause the computer system to: receive client information (including information related to at least a plurality of parameters for projecting future values associated with the retirement plans); determine a first retirement plan based upon the received client information; present information regarding the first retirement plan to a user simultaneously with the information regarding the first retirement plan; present a plurality of options to change the parameters; receive an indication of a parameter change (including a selection of at least one of the plurality of options to change the parameters); determine a second retirement plan based upon the client information and the indication of the parameter change; and present information regarding the second retirement plan to the user simultaneously with a second plurality of options to change the parameters.

BRIEF DESCRIPTION OF THE DRAWINGS

The figures described below depict various aspects of the applications, methods, and systems disclosed herein. It should be understood that each figure depicts an embodiment of a particular aspect of the disclosed applications, systems and methods, and that each of the figures is intended to accord with a possible embodiment thereof. Furthermore, wherever possible, the following description refers to the reference numerals included in the following figures, in which features depicted in multiple figures are designated with consistent reference numerals.

FIG. 4 illustrates a screenshot of an exemplary embodiment of a form for entering information regarding a custom goal;

DETAILED DESCRIPTION

Although the following text sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112(f).

Figure 1A:
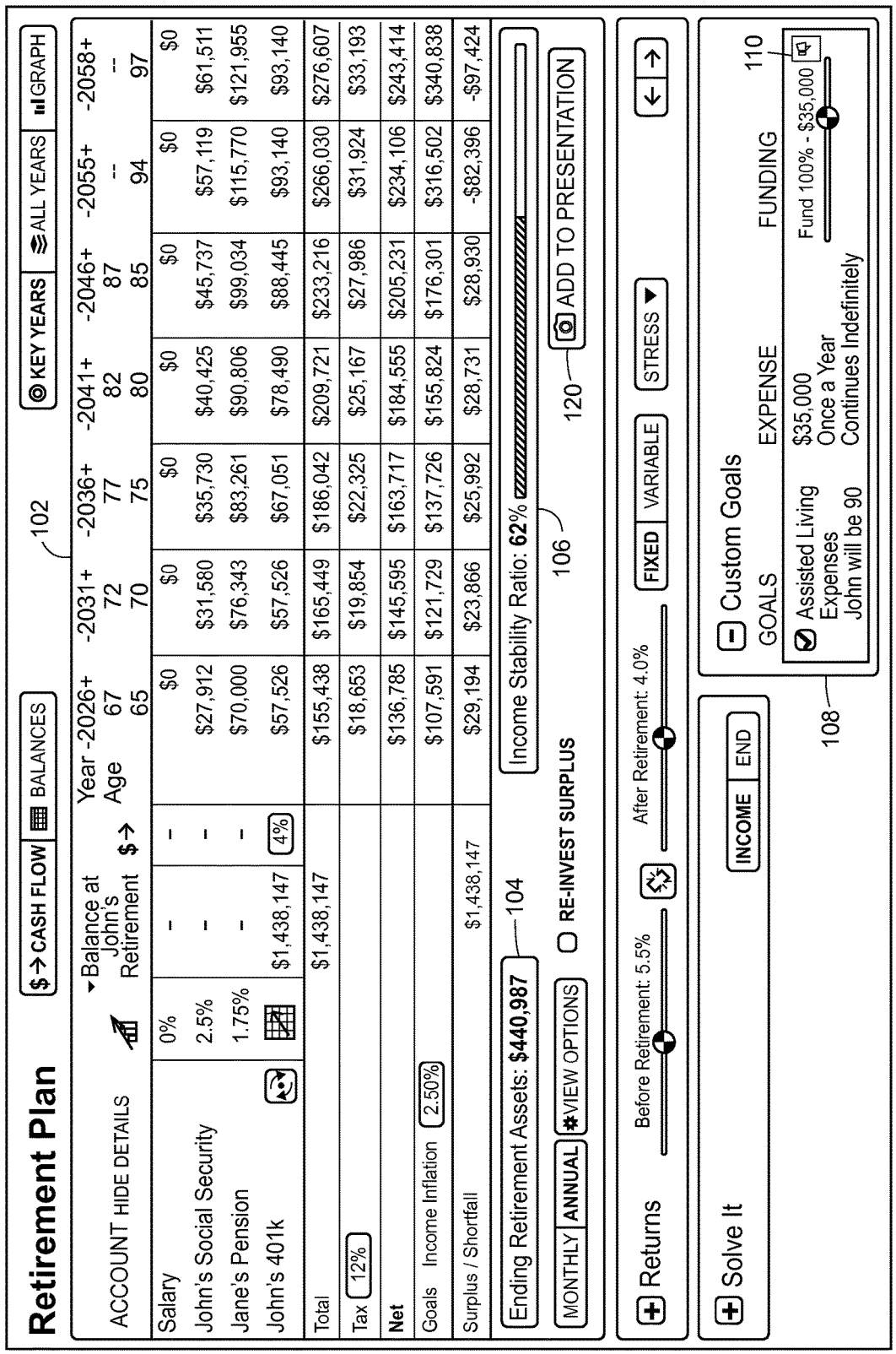
FIGS. 1A-C illustrate screen shots of exemplary retirement plans for a client.
Figure 1B:
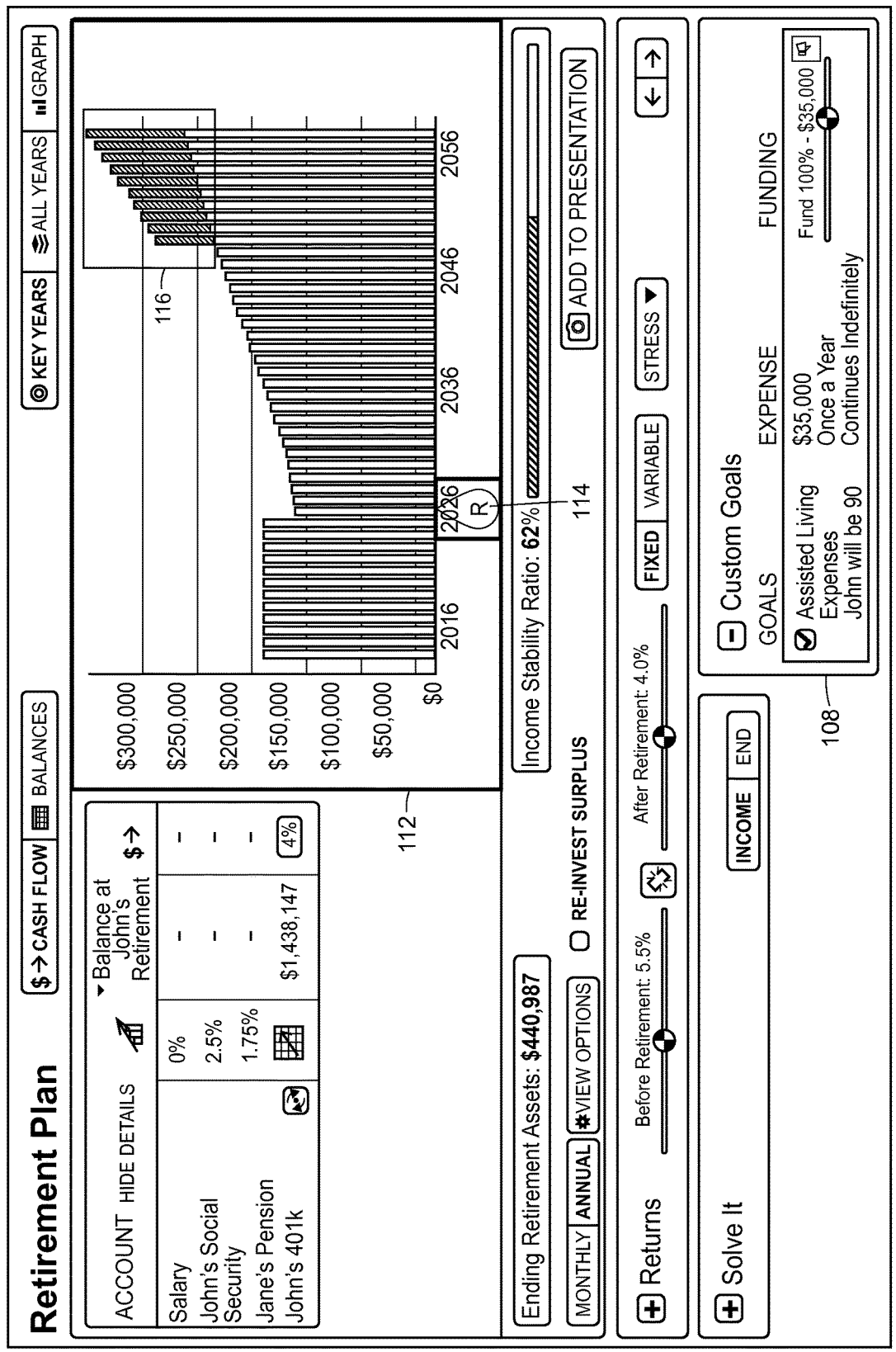
Figure 1C:
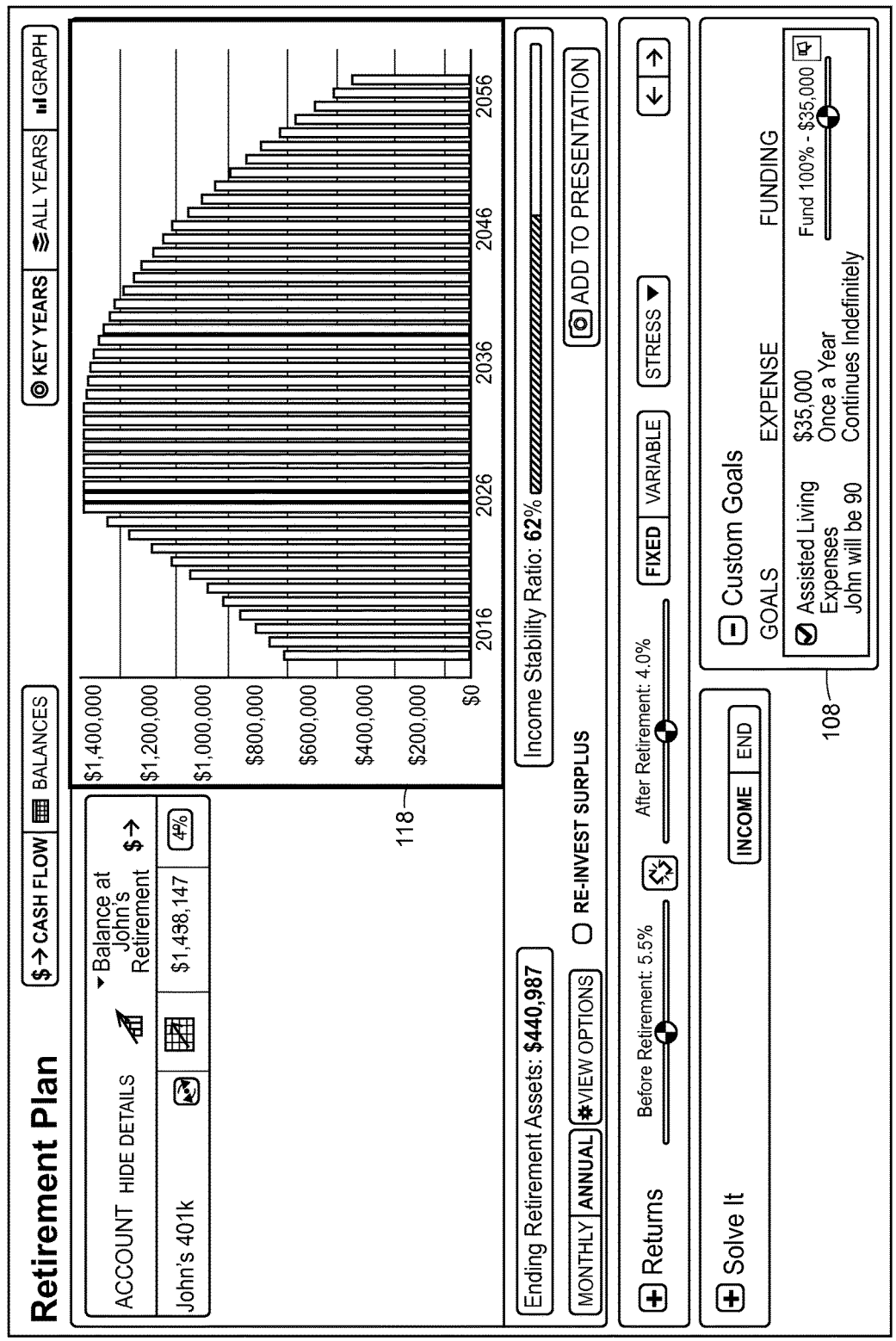

FIGS. 1A-1C illustrate screen shots of an exemplary retirement plan for a client. The retirement plan incorporates a plurality of projections regarding future values related to the client's income, expenses, assets, or liabilities during retirement. The projections may begin with current values of assets (e.g., retirement accounts) or estimates of future income sources (e.g., pensions or Social Security). The projections may then apply a number of assumptions regarding rates of return, inflation, taxes, years until retirement, or other similar parameters to determine projected values for the client's assets and income during retirement. The rate of return, retirement age, and withdrawals from assets are of particular importance in determining whether the retirement plan will meet the client's retirement income goals. In some embodiments, the retirement plan may include projections based upon parameters associated with one or more of the following: retirement income from one or more sources during retirement, expenses during retirement, retirement age, rate of return on investments, rate of return on other assets, length of client life, healthcare expenses, recurring expenses, nonrecurring expenses. In some embodiments, the retirement plan may include an income stability ratio as a measure of volatility in the projections based upon market risk. The income stability ratio is a ratio of the product of the ratio of projected protected income to projected total income and the ratio of projected net income to the retirement income goal in each year, and it may be averaged over the retirement period.

FIG. 1A illustrates a tabular summary of a retirement plan, showing cash flows from a plurality of income sources at key years during the client's retirement period. The tabular block 102 contains projected values for income sources, including withdrawals from assets. The tabular block 102 also includes information regarding projected taxes, net income, and the client's inflation-adjusted retirement income goals. Based upon this information, the surplus or shortfall in each year may be projected and presented within the tabular block 102. Additionally, the retirement plan may include a projection of ending retirement assets 104 and an income stability ratio estimate 106. In some embodiments, the retirement plan may also include information regarding custom goals beyond a base level of desired income during retirement, which may include custom goals for significant recurring or non-recurring expenses (e.g., travel, health care, weddings, second homes, etc.). In some embodiments, the custom goals may be presented in a custom goal block 108, which may include a success indicator 110 to indicate whether the projected income is sufficient to fund the custom goals at a selected level.

In addition to the tabular summary of income in FIG. 1A, the retirement plan may be presented in a variety of other formats. FIG. 1B illustrates a graphical summary of the retirement plan showing client income in each year through the retirement period in an income graph 112. The income graph 112 may include a retirement year marker 114 to indicate the retirement year used as a parameter in the projections underlying the retirement plan. In some embodiments, the chart may include an indication of a shortage 116, such as by shading a portion of the graph a different color or pattern.

Although the tabular and graphical summaries of FIGS. 1A and 1B present information regarding income projections of the retirement plan, other metrics may also be used. FIG. 1C illustrates a graphical summary of the retirement plan showing total asset value through the retirement period. The balance graph 118 shows the balance in all accounts, which is seen increasing until the retirement year and eventually decreasing thereafter. It should be understood that FIGS. 1A-1C are exemplary only, and that other types of retirement plans may be generated and that other means of presenting retirement plans may be used.

In some embodiments, some or all aspects of the retirement plan discussed above may be added to a presentation for the client. This may include adding some or all of the information regarding the retirement plan as a slide in a presentation. In a preferred embodiment, the presentation of the retirement plan includes a presentation option 120 to add one or more slides to a presentation. When the user selects the presentation option 120, one or more slides derived from the presented retirement plan may be displayed to the user for selection. The slides may include representations of part or all of the retirement plan, such as the tabular block 102, the income graph 112, or the balance graph 118. The slides may further contain information regarding all time periods or only key time periods (e.g., every fifth year before and after retirement). The user may select one or more of the slides to add to the presentation, and the slides may be then appended to the end of the presentation. In some embodiments, one or more default slides may be automatically generated for the presentation, to which additional slides may be appended. For example, a title slide may be generated automatically upon creation of a new client profile by the user. As parameters are adjusted and new retirement plans are generated, as discussed further below, the user may select part or all of any of the plans to append to the presentation. Once a plurality of slides have been added, the user may further reorder the slides. When completed, the slide presentation may be saved, exported, or printed for presentation to the client.

The embodiments described herein may be implemented using a retirement plan generation and optimization system 900, described in further detail below. The system 900 includes front end components 902 and back end components 904, communicatively connected through a network 930. The front end components may be disposed within a computing device 910 operated by a user, which may include a display 912 and a controller 916 with a microprocessor 920 and a program memory 922. The back end components 904 may be disposed within one or more servers 940, each including a processor 962 and a program memory 960. Each server 940 may further include or be communicatively connected to one or more databases 946.

Figure 2:
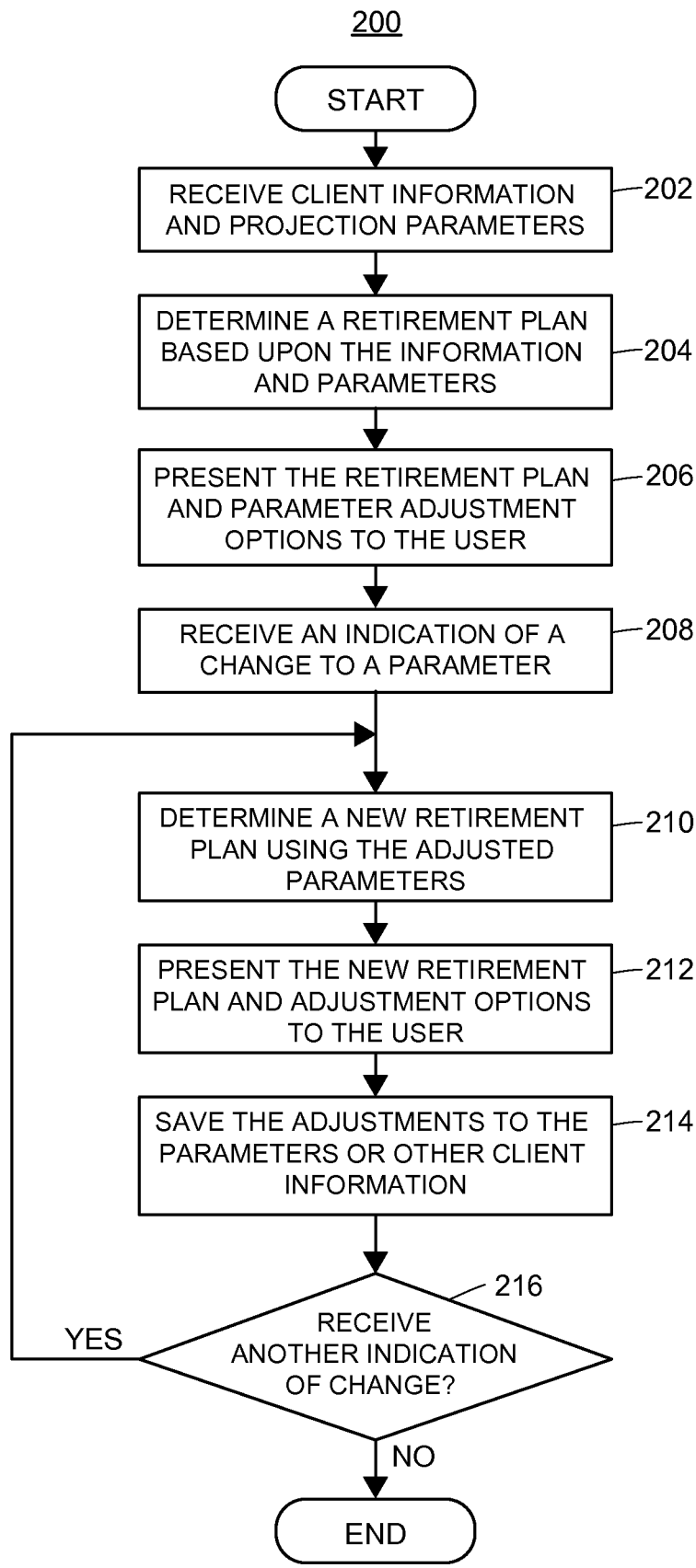
FIG. 2 illustrates a flow diagram of an exemplary retirement plan generation and adjustment method.

FIG. 2 illustrates a flow diagram of an exemplary retirement plan generation and adjustment method 200. The method 200 receives client information and parameters, from which the method generates and presents a retirement plan as discussed above. The method 200 presents a plurality of options for adjustments, changes, or "what if" scenarios to the user along with the retirement plan. When the user selects one of the options to change the parameters upon which the retirement plan is based, the method 200 immediately adjusts the retirement plan as displayed to the user in real-time. Because the parameter adjustment options are displayed simultaneously with the retirement plan (e.g., in separate portions of one page within an application window or browser window), the retirement plan appears to be adjusted in real-time (i.e., without a noticeable delay) as the user adjusts one or more parameters. Likewise, in some embodiments, when a user adjusts a parameter using a slider bar, the displayed retirement plans may smoothly adjust through a plurality of retirement plans as the user operates the slider. After the parameters have been adjusted, the changes may be saved to a database or other computer storage medium or device. The method 200 may then repeat the steps involved in adjusting the parameters, generating adjusted retirement plans, and displaying the adjusted retirement plans to a user as long as changes to the parameters are received.

At block 202, the method 200 may begin by receiving client information and parameters at the controller 916. The client information may include information regarding the identity, family, finances, or goals of the client, as well as parameters used in determining future values for the retirement plan. This information may further include the client's name, age, spouse, spouse's age, dependents and their ages, income (e.g., salary, commissions, distributed profits, rental income, dividends, etc.), retirement assets (e.g., 401k accounts, IRA accounts, etc.), other financial assets (e.g., brokerage accounts, bank accounts, trusts, deferred compensation, directly held equities or debt instruments, etc.), other non-financial assets (e.g., real estate, vehicles, artwork, etc.), insurance policies, annuities, expected inheritances, current expenses (e.g., mortgage service, other debt service, rent, taxes, tuition, healthcare expenses, travel, etc.), anticipated expenses during retirement (e.g., custom goals), anticipated retirement income sources (e.g., pension, Social Security, retirement account withdrawals, rental income, etc.), or retirement income goals (e.g., annual income levels from anticipated retirement income sources, funding for recurring or non-recurring custom goals, etc.). The parameters may include assumptions used in determining the retirement plan, including retirement income goals, assumptions regarding rates of return, retirement ages, expenses during retirement, tax rates, defined benefit income source solvency, or other related assumptions that impact projections of retirement finances of the client. The parameters include information that may vary over time and that may affect projections of income or assets over time. For example, parameters may include estimates of information that will be determinable only in the future (e.g., market returns on assets held), whereas client information also includes information ascertainable at the time the retirement plan is determined (e.g., current values of assets, client age, etc.). In some embodiments, the client information may include the parameters. In some embodiments, the client information may be received at a computing device 910, transmitted via the network 930 to the server 940, and stored in the database 946. Such stored client information may be later retrieved by the same or different computing device 910 via the network 930 from the database 946.

At block 204, the controller 916 may determine a retirement plan based upon the received information, including the parameters. The retirement plan may include income statements, cash flows, balance sheets, or other standard financial metrics. Additionally or alternatively, the retirement plan may include information regarding the following: expected retirement year or age, asset rates of return, asset balances at retirement, asset balances at other times, income sources, income source growth, total income levels, withdrawals of assets, inflation, taxes, market conditions, additional goals (e.g., recurring or non-recurring expenses), additional savings, or other similar financial information. The retirement plan may be determined using known methods by projecting future assets, liabilities, expenses, and income based upon the received information and parameters. For example, a retirement account such as a 401k account may be assumed to grow at an average rate of return (e.g., 5%) each year from the time of the retirement plan until the anticipated retirement year, with additional funding each year until retirement (e.g., 10% of the client's gross annual income), to determine a projected value of the retirement account at the anticipated retirement year. The same account may further be projected to decrease in value by regular withdrawals during retirement (e.g., by withdrawals totaling 4% per year) from the anticipated retirement year to the year in which the client reaches the age of his or her life expectancy. Using the parameters, the method 200 may determine projected surpluses or deficits in each year before or during retirement by comparing the retirement income goals with the total income from all sources and total expenses. In some retirement plans, one or more assets may be drawn down by additional withdrawals to eliminate any deficits in each year until the assets are depleted. In some embodiments, the method 200 may automatically determine the one or more assets from which to withdraw additional funds by determining the tax effects or rates of return on each of a plurality of assets. For example, the method 200 may determine that the client should defer withdrawing any amount from a higher-return account until lower-return sources are depleted.

At block 206, the determined retirement plan may be presented to the user using the display 912 or other means. Part or all of the retirement plan may be presented to the user, and the presentation may include options to view additional information or to adjust the manner of displaying the information. For example, the retirement plan presented to the user may include information regarding assets, income, and expenses on one window, while presenting summary information regarding parameters such as returns on assets, retirement age, or retirement income goals. The user may also be presented with options to expand the summaries to obtain more detailed information regarding the parameters or to adjust the parameters. Along with the determined retirement plan, a plurality of options to change or adjust one or more parameters affecting the projections of the retirement plan may be presented to the user at block 206. The options may include options to manually adjust one or more parameters (e.g., a slider to select an additional amount to save each month year prior to retirement, a drop-down bar to select an anticipated rate of inflation, a text box to enter an adjusted retirement income goal, or a check box to select or deselect a custom goal). Additionally, or alternatively, the options may include options to automatically adjust one or more parameters to meet retirement income goals or other goals of the client (e.g., automatically adjust retirement income or automatically adjusts additional monthly savings prior to retirement to eliminate projected income deficits for the entire projected retirement period). These options thus allow a user to quickly determine alternative scenarios for the retirement plan. In a preferred embodiment, the information regarding the retirement plan and the options to change the parameters are displayed simultaneously on the display 912, such as within one window or tab within an application window or internet browser. This preferred embodiment allows real-time display of adjustments of the retirement plan in response to user adjustments of parameters, as discussed further below.

At block 208, the controller 916 may receive an indication of a change to a parameter, such as an adjustment of a parameter by using one of the plurality of options displayed at block 206. In a preferred embodiment, the indication is received immediately upon an adjustment to one or more of the parameters. Alternatively, the user may be able to adjust a multiplicity of parameters before the indication of the parameter changes is received (e.g., by requiring the user to select an option to determine a new plan based upon the adjustment prior to any adjustments being made to the parameters). In some embodiments, the received indication of a change or adjustment to one or more parameters may be stored in the program memory 922 or transmitted to the server 940 for storage in the program memory 960.

At block 210, the controller 916 may determine a new retirement plan based upon the received information, including the indication of the change or adjustment to one or more parameters. The new retirement plan may include the same type of information determined with respect to the retirement plan determined at block 204, as discussed above and further discussed below.

At block 212, the new retirement plan determined at block 210 may be presented to the using the display 912 or other means. In a preferred embodiment, the new retirement plan is presented to the user by updating the values presented to the user in real-time (i.e., without a noticeable delay between the time the user adjusts a parameter and the time the new retirement plan is presented). For example, a change in the market rate of return on assets prior to retirement may be selected by a user, and the values presented in a table or chart that depend upon the rate of return may immediately be determined and presented without changing any other information or layout in the window viewed by the user. As in block 206, part or all of the retirement plan may be presented to the user, with some portions minimized or presented in summary form. Also as above, the plurality of options to change or adjust the parameters further may be presented. It should be understood that necessary modifications to the presented options may be made based on the previous adjustments to the parameters (e.g., a slider on a slider bar may be repositioned to the adjusted parameter value received at block 208). In some embodiments, the layout of the presentation may be reset to a default layout (e.g., with information presented in a tabular or chart form, some information being presented only in summary form, etc.). In a preferred embodiment, however, the layout remains as it was before the indication of a change to a parameter was received. This provides a smooth user interface and enables the user to make direct comparisons of the effects of adjustments to the parameters.

At block 214, the indication of a change or adjustment to one or more parameters received at block 208 may be stored in the program memory 922 or transmitted to the server 940 for storage in the program memory 960. Additional information regarding the client, the determined new retirement plan, or the layout of the presentation of the new retirement plan may also be stored in program memories 922 or 960 for future use.

At block 216, the controller 916 may determine whether an additional indication of a change or adjustment to a parameter has been received. When an additional indication is received, a new retirement plan is determined and presented and the adjusted parameters saved at blocks 210-214, as above. When no additional indication is received, the method 200 eventually ends. It will be understood that the method 200 may require a user entry or time-out event to end the method, such as an action by the user closing a program, application, window, or tab. The method 200 may also terminate at any time if so instructed by a user.

Although the method 200 illustrates a general process flow of an exemplary retirement plan generation and adjustment method, the methods and figures described below further describe additional operations, functions, or features that may be implemented consistently with the invention as described in method 200. The following embodiments provide additional detail or alternative embodiments of part or all of the method 200, all of which are consistent with the invention as described herein.

Figure 3:
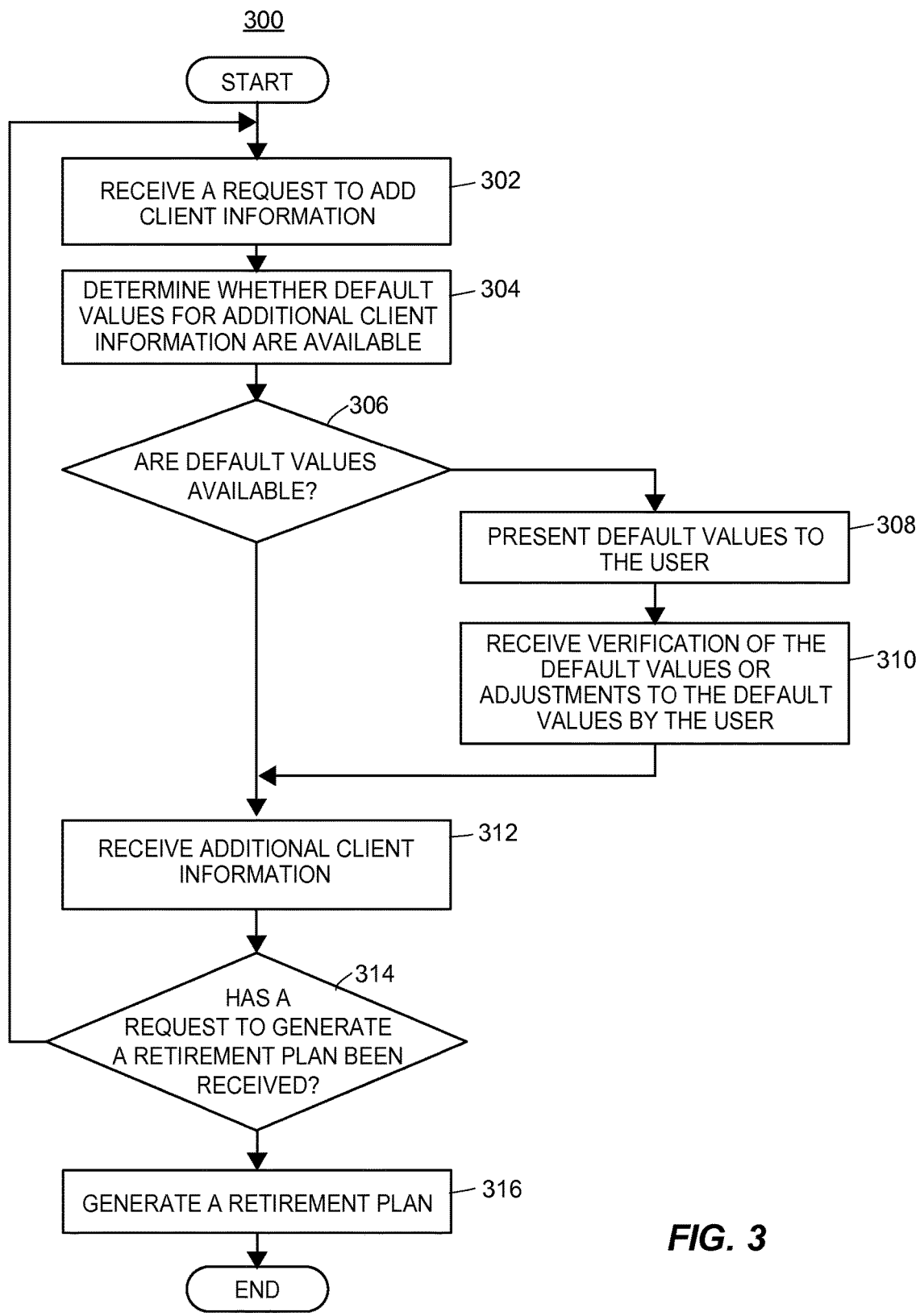
FIG. 3 illustrates a flow diagram of an exemplary data entry method for prepopulating default values for client information and parameters based upon frequent responses.

FIG. 3 illustrates a flow diagram of an exemplary data entry method 300 for prepopulating default values for client information and parameters based upon frequent responses. The data entry method 300 may be implemented during an initial client setup phase or at a later time to add or alter client information and parameters. The user initiates the method 300 by requesting the addition or alteration of information of an item relating to a retirement plan. When the user has made at least one entry or selection, the method determines whether additional related information that has yet to be entered may be prefilled for the user with default values. If default values for the information can be determined, then the method presents the default values as prepopulated values within a form. The user may either accept the prepopulated values or may adjust the prepopulated values as necessary to ensure accuracy of the information. The user may also input additional information, as necessary. Once the user has finished entering information for a particular item, the user may further enter additional information relating to other items using the same steps. The method 300 ends when the user requests the generation of a retirement plan based upon the information.

At block 302, the controller 916 receives a request to add client information from the user. The request to add client information may include a request to add a new item or adjust an item of client information regarding the identity, family, finances, or goals of the client. The request may be received as a result of a user action to create a new item or edit an existing item and may include a selection of a type of information item to add or edit. The request to add client information may include multiple steps, or multiple requests may be received for each information item. For example, the user may generate a request to add a new information item relating to a source of retirement income, select one of several types of income sources, and enter information regarding the income source (e.g., when the source starts, the income level, annual increases to the income level, etc.).

At block 304, the controller 916 determines whether any default values are available for the information item. The determination may first include determining whether any additional information relating to the information item may be entered. For example, in some embodiments, information item data may be accepted only through a plurality of electronic forms, each of which has a finite number of fields. When the user selects an information item to add or edit, the appropriate form may be determined and presented to the user. At block 304, the controller 916 may determine whether any additional fields are available for data entry. If each field has a value associated with it, then the controller 916 may determine that no default values are available because the default values should not replace values already entered. If at least one field has no value or a null value associated with it, then the controller 916 may further determine whether a default value is available for the empty field. The default value may or may not depend upon client information or parameters already entered. For example, a retirement income goal may be prepopulated with a default value of 80% of the client's current income, thus causing the default value to depend upon other client information. As another example, the default value for the rate of inflation to apply to the client's income goal may be prepopulated at a default based on macroeconomic analysis (e.g., 3% for all clients), such that the default rate of inflation does not depend upon other client information. Default values or rules for generating default values (e.g., default retirement income goal as 80% of client income) may be stored in the program memory 922 or 966.

When one or more default values are determined to be available at block 306, the method 300 proceeds to present the one or more default values to the user at block 308. When no default values are determined to be available at block 306, the method 300 proceeds instead to receive any additional client information from the user at block 312.

At block 308, the default values determined at block 304 may be presented via the display 912 to the user for review and either verification or adjustment. In a preferred embodiment, the determined default values may be inserted into the appropriate fields of forms displayed to the user, such that no additional action is needed by the user to enter or verify each default value separately. Instead, any default values not changed by the user will be considered verified when the item is verified or saved by the user. In some embodiments, the default values may be displayed at block 308 to have a different appearance (e.g., text color, background color, etc.) from information entered by the user in order to provide a visual indication of the default values presented.

At block 310, the controller 916 receives either verification of the default values presented to the user or adjustments to the default values presented to the user. As noted above, verification may include the completion or saving of the item or form on which the user is working without an adjustment to one or more of the presented default values. Adjustments to the presented default values may also be entered by the user, in which case the adjusted values will be stored and used in generating one or more retirement plans for the client. For example, the user may create a client profile including a client's retirement income goal, which profile prepopulates with a default rate of inflation. If the user simply saves the profile, the default rate of inflation may be treated as verified. The user could instead adjust the rate of inflation either up or down if desired. Additionally, or alternatively, some embodiments may require the user to expressly verify or reject the default values. In such embodiments, rejection of the default values may include either full rejection or adjustment of the default values.

At block 312, the controller 916 may receive any additional client information related to the information item from the user. The additional information may include information for which no default values were available. When no such additional information is entered, the block 312 may be bypassed. After any additional information has been entered and received by the controller 916 at block 312, the controller 916 may next determine whether a request to generate a retirement plan has been received from the user at block 314. Where no request to generate a retirement plan has been received, the method 300 may continue upon receipt of another request to add or adjust client information or parameters at block 302. Where a request to generate a retirement plan has been received, the method 300 may proceed to generate a retirement plan for the client based upon the client information and parameters at block 316, as discussed elsewhere herein.

As an example of the data entry method 300, a user may create a profile for a client and add information regarding the client and the client's finances, from which a retirement plan may be generated. The client profile may include information such as the client's name, age, income, and retirement goal, along the with similar information for the client's spouse. The client's joint retirement income goal in current dollars, an expected rate of inflation, and a survivor's retirement income goal as a percentage of the joint retirement income goal may also be entered.

Continuing the example, the user may next generate a request to add additional client information, such as an income source. In some embodiments, a form with a plurality of fields for information regarding a retirement income source may be displayed when the user selects an option to create a new information item regarding retirement income. Once the type of retirement income is selected (e.g., Social Security), a default description is determined and displayed (e.g., "John's Social Security"). Additional default values may also be determined and presented, including the time at which the income source starts, an annual rate of increase for the level of income from the source, and a time at which the source ends. An option to generate an automatic calculation or estimate may also be presented, which may open a new window within the form to estimate the future value of the income source using information on current earnings and the client's age. Once the estimate is determined, the results may be populated into the income level field. The user may then review the information and verify it by selecting a save option. Once the information item is saved, it is added to the list of retirement income sources for the client.

Similarly, the user may generate a request to add an asset, such as a 401k retirement account. As above, a form that may be displayed to the user when the controller 916 receives a request to add a new asset. Within the form, account type and asset type fields may be presented to the user as drop down boxes with lists of available types. Once the user selects the account type (e.g., "401k"), the form may adjust to accept information relevant to that account type (e.g., periodic contributions, employer matching funds, withdrawal rate upon retirement, etc.). As above, default values may be determined and displayed for rate of withdrawal and timing of withdrawals from the asset. Similarly, the user may also select the asset type and enter additional information for which no default values were determined to be available. As above, the information may be verified by the user and saved, at which point it may be stored in the program memories 922 or 960 or in the database 946.

Custom goals may also be created and edited in the same manner as income sources and assets above. FIG. 4 illustrates a screenshot of an exemplary form for creating a custom goal, showing a custom goal relating to assisted living expenses. The user may first select a type of custom goal from a dropdown box. Here, the "Assisted Living" type has been selected. Once the type has been selected, a default value for the description may be determined and displayed, as shown. The default value can be identified in FIG. 4 by the lighter shade of the description text. The user may change the description for the custom goal if so desired, as described above. Additional default values may likewise be determined and displayed, such as a start date, end date, inflation rate, etc. The user may change any of the default values or may enter further information regarding the custom goal, such as the annual expense, which may then be adjusted by a default or user-entered rate of inflation. The custom goals may be used to increase the projected expenses or retirement income goal for part or all of the client's retirement, as discussed further below. In the example shown in FIG. 4, the expense is projected to begin when the client reaches the age of ninety and continue through the remainder of the client's life.

Continuing the example, when the user has finished entering client information, the user may request that a retirement plan be generated. Upon receiving a user request to generate a retirement plan, the controller 916 may determine and present a retirement plan to the user based upon the received client information, such as the retirement plans illustrated in FIGS. 1A-C. The exemplary retirement plan may show the user information regarding the client's anticipated sources of retirement income, the client's assets, the client's retirement income goal, and additional information regarding various parameters used in the retirement plan.

Figure 5:
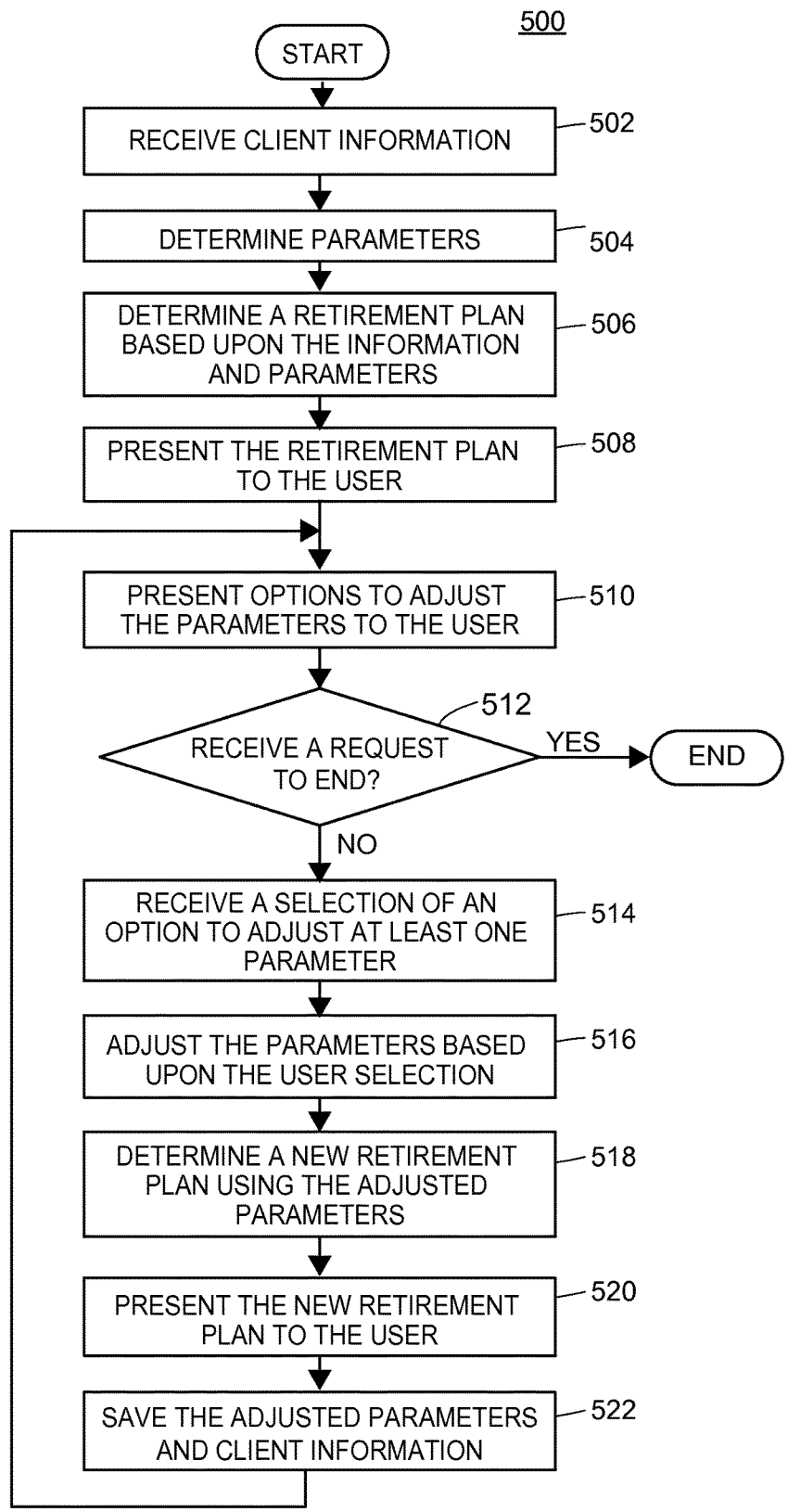
FIG. 5 illustrates a flow chart of an exemplary retirement plan determination and adjustment method for determining a retirement plan, receiving adjustments to parameters, and determining and presenting a new retirement plan.

FIG. 5 illustrates a flow chart of an exemplary retirement plan determination and adjustment method 500 for determining a retirement plan, receiving adjustments to parameters, and determining and presenting a new retirement plan. The method 500 begins by receiving client information and determining parameters for the projections involved in determining the retirement plans. A first retirement plan is then determined and presented to the user, along with a plurality of options to change the parameters. When the user selects one or more of the options to change the parameters, the parameters are changed to the selected values, and a second retirement plan is determined and presented to the user. If the user selects further options to change the parameters, the parameters are further changed, and subsequent retirement plans are determined and presented.

The method 500 may be implemented by the controller 916 of the computing device 910, as discussed further below. The retirement plan and other information or options may be presented to the user by the display 912, and the user may enter information or make selections using the input 914. In some embodiments, the computing device 910 may communicate with the server 940 via the network 930 to send information or selections received from the user to the server 940 or to receive stored or determined information from the server 940.

At block 502, the controller 916 may receive client information for a client. The information may be received from the user, the program memory 922, or from the server 940 (including the program memory 960 and the database 946). The client information may include information regarding the client and the client's current finances, as well as information regarding the parameters relating to future values of variables.

At block 504, the controller 916 may determine the parameters involved in projecting future values of client income, expenses, liabilities, and assets. This may include determining future rates of return based upon the asset type, income sources, laws, regulations, rules, tax rates, client's state of residence, or other information. Additionally, or alternatively, determining the parameters may include retrieving data stored in the database 946 or in the program memory 922. In some embodiments, the client information may include specific values for the parameters, in which case the block 504 may not be implemented.

At block 506, the controller 916 may determine a retirement plan based upon the client information and the parameters. The retirement plan may include income statements, cash flows, balance sheets, or other standard financial metrics. As discussed above, the retirement plan may be determined using known methods by projecting future assets, liabilities, expenses, and income based upon the client information and parameters to determine projected surpluses or deficits in each year before or during retirement. In some retirement plans, one or more assets may be drawn down by additional withdrawals to eliminate any deficits in each year until the assets are depleted. Additionally, the retirement plan may be determined to use or withdraw funds in an advantageous manner under application tax or other laws and regulations.

Figure 6A:
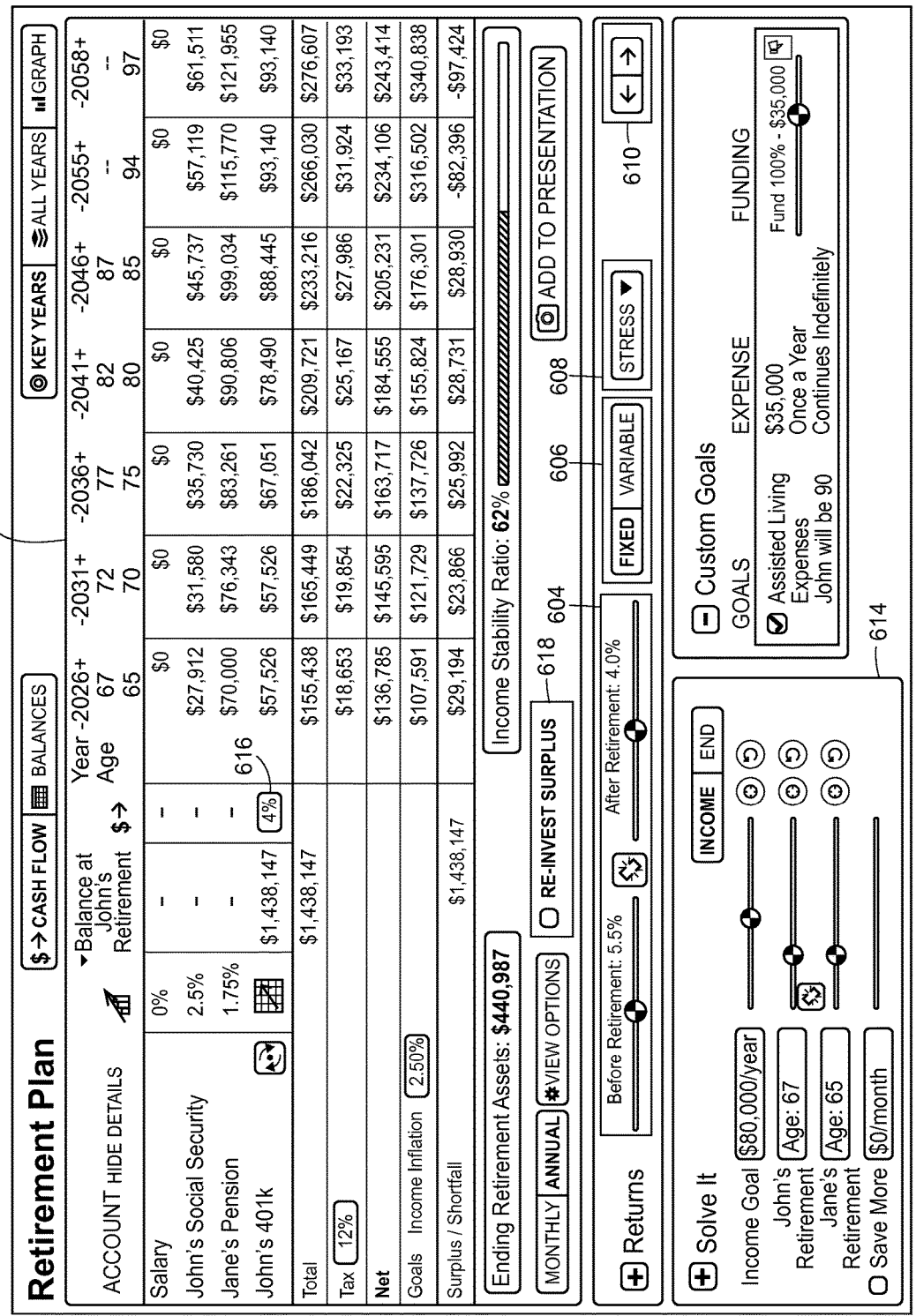
FIGS. 6A-I illustrate screenshots of an exemplary presentation of a retirement plan, showing the presentation and selection of options to adjust the parameters by a user.

At block 508, the controller 916 may present or cause the retirement plan to be presented to the user by the display 912 or other means. As discussed above, part or all of the retirement plan may be presented to the user in summary form, in tabular or graphical format. Additionally, some information regarding the retirement plan may be obscured or hidden when presented to the user. The presented retirement plan may include one or more options related to layout or presentation of the information. FIG. 6A illustrates a screenshot of an exemplary presentation of a retirement plan showing the retirement plan in tabular form. Projected income from all sources (including withdrawals from assets), retirement income goals (including custom goals), and the surplus or shortfall of the projected income are shown for representative years during the retirement period in tabular block 602. The shortfalls in the final periods indicate a deficiency in the retirement plan under the parameters used in the projections. Therefore, the user may want to adjust one or more of the parameters to obtain a new retirement plan with sufficient income to meet the retirement income goals throughout the client's projected retirement period.

At block 510, the controller 916 may present or cause a plurality of options to change or adjust the parameters relating to the retirement plan to be presented to the user by the display 912 or other means. The plurality of options may be presented simultaneously with the retirement plan, discussed above in relation to block 508. In a preferred embodiment, the plurality of options are presented within the same window as the retirement plan information, such that the user may select one or more of the options to change or adjust the parameters without hiding or obscuring the displayed retirement plan information. This enables the method 500 to adjust the information in the retirement plan in response to a selection of an option to change a parameter in real-time. FIG. 6A illustrates this preferred embodiment, in which the retirement plan information in tabular block 602 occupies the same window without being obscured by parameter change options. Although a number of specific options to adjust or change parameters are described herein, it should be recognized that additional parameters relating to projections of future values of assets, liabilities, income, or expenses may be included in some embodiments.

Figure 6B:
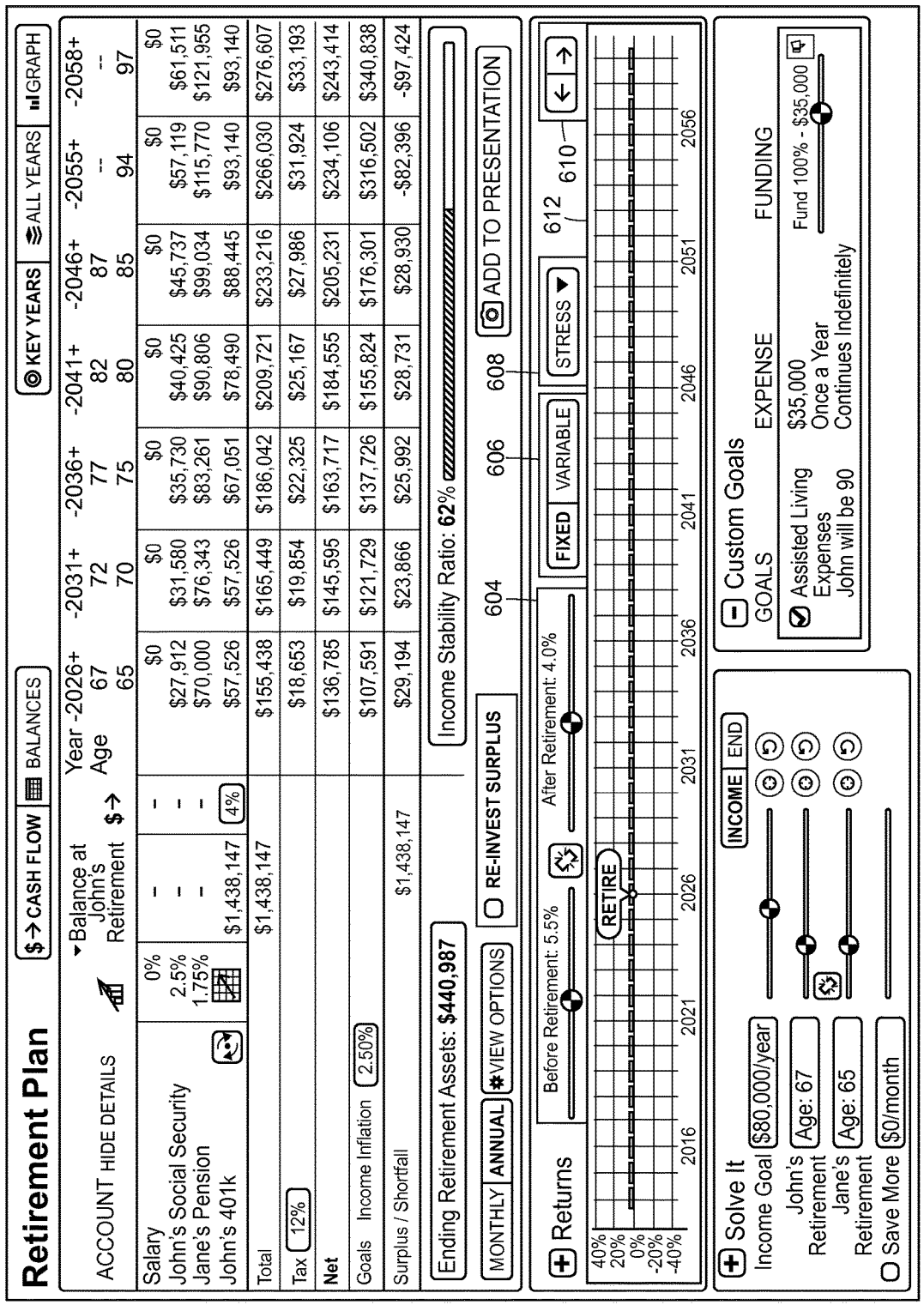
Figure 6C:
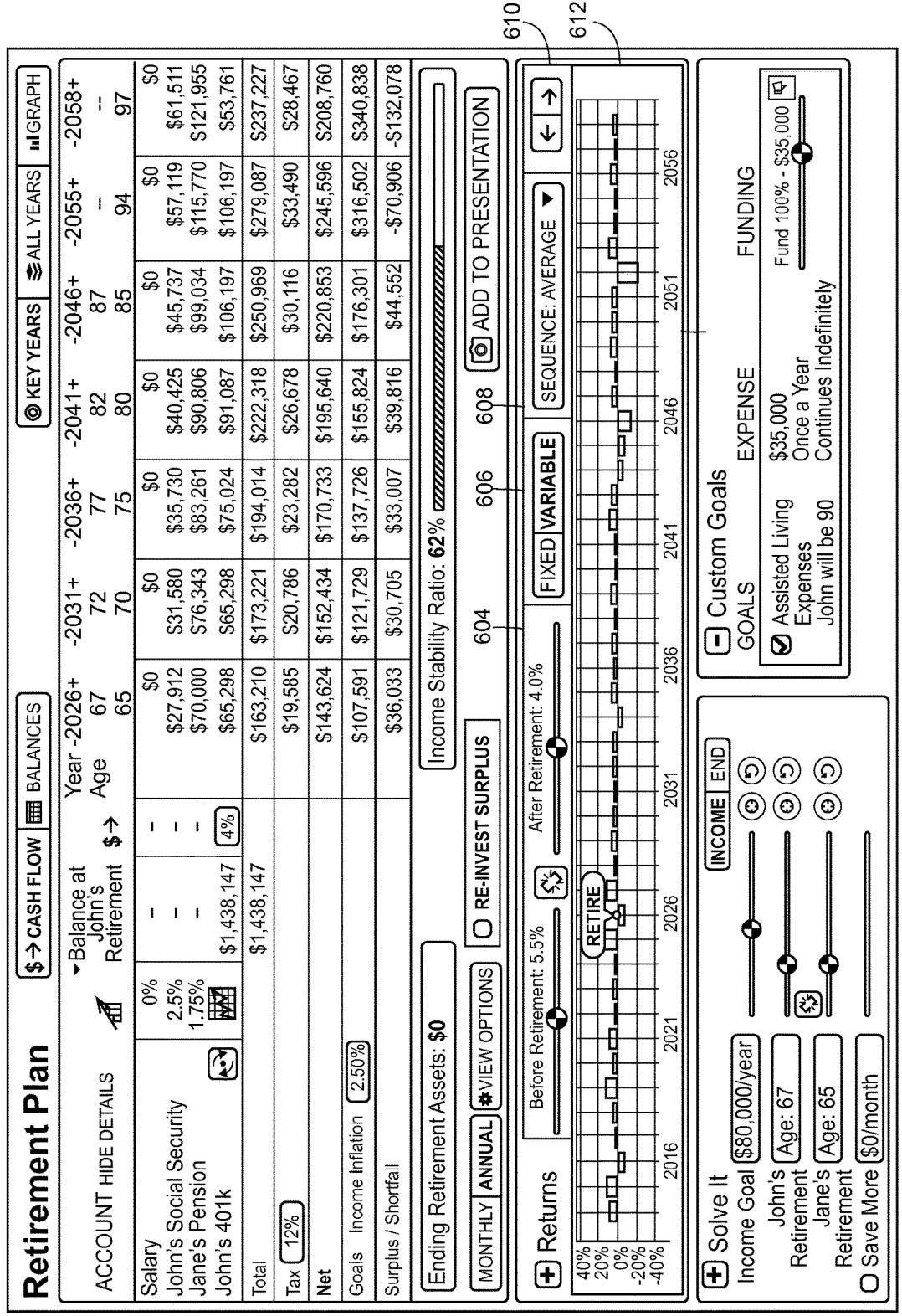

Parameter change options 604-610 allow the user to adjust parameters relating to the rate of return on client assets. The asset rate of return options 604 allow the user to adjust the expected rate of return on assets subject to market risk. In the exemplary embodiment, the rates of return may be adjusted together or separately for the periods before and after the client's retirement. This allows the user to produce a plan that accounts for lower-risk investing during the retirement period that before the client's retirement. Similarly, the asset return type options 606 allow the user to adjust whether the asset values are projected based upon a fixed rate of return in each year or whether the asset values are projected based upon a variable rate of return with an average return as indicated by the asset rate of return options 604. FIG. 6B illustrates a screenshot of the exemplary presentation of the retirement plan, showing additional options to change parameters relating to the rate of return on assets. Specifically, it shows an annual rate of return chart 612 for each year before and during retirement with a fixed rate of return. FIG. 6C illustrates a screenshot of the exemplary presentation of the retirement plan, showing the same average annual rate of return with a variable rate of return. Even through the average rate of return remains unchanged, the variation in rates of return shown in FIG. 6C can result in changes to the retirement plan's income and asset values. A comparison of the fixed and variable returns shows the importance of assumptions regarding market returns and timing on the retirement plan.

Figure 6D:
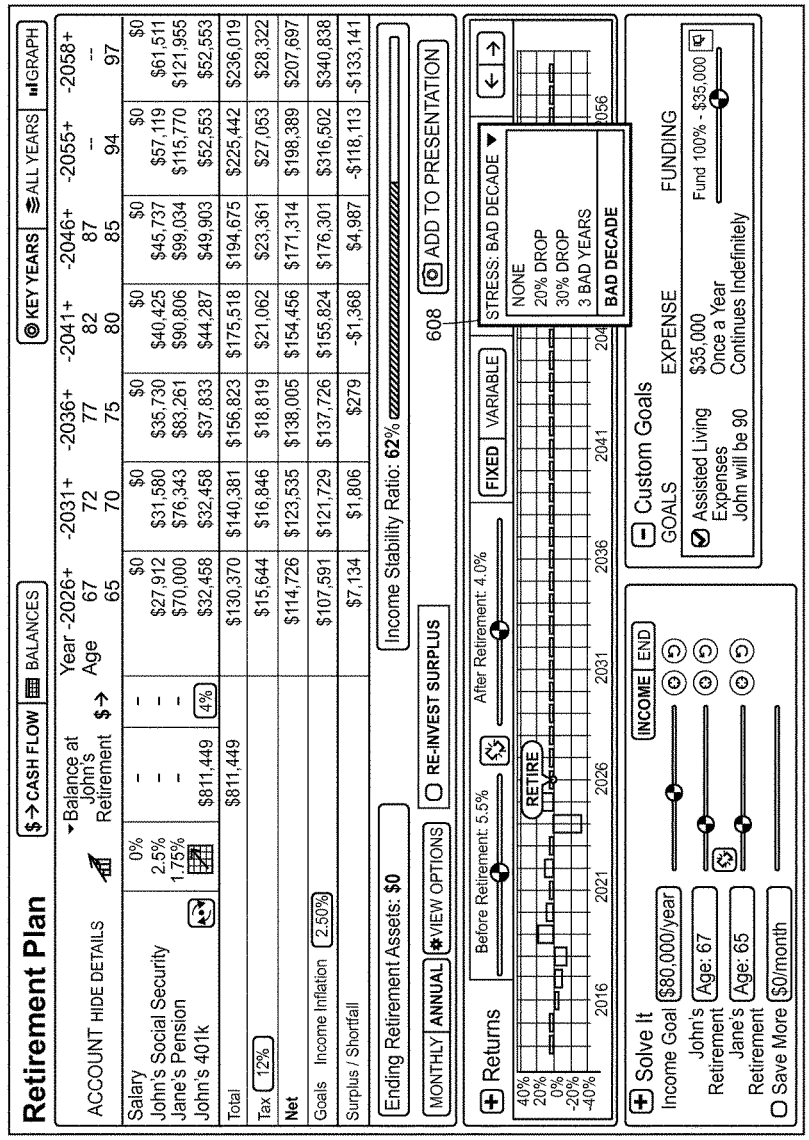
Figure 6E:
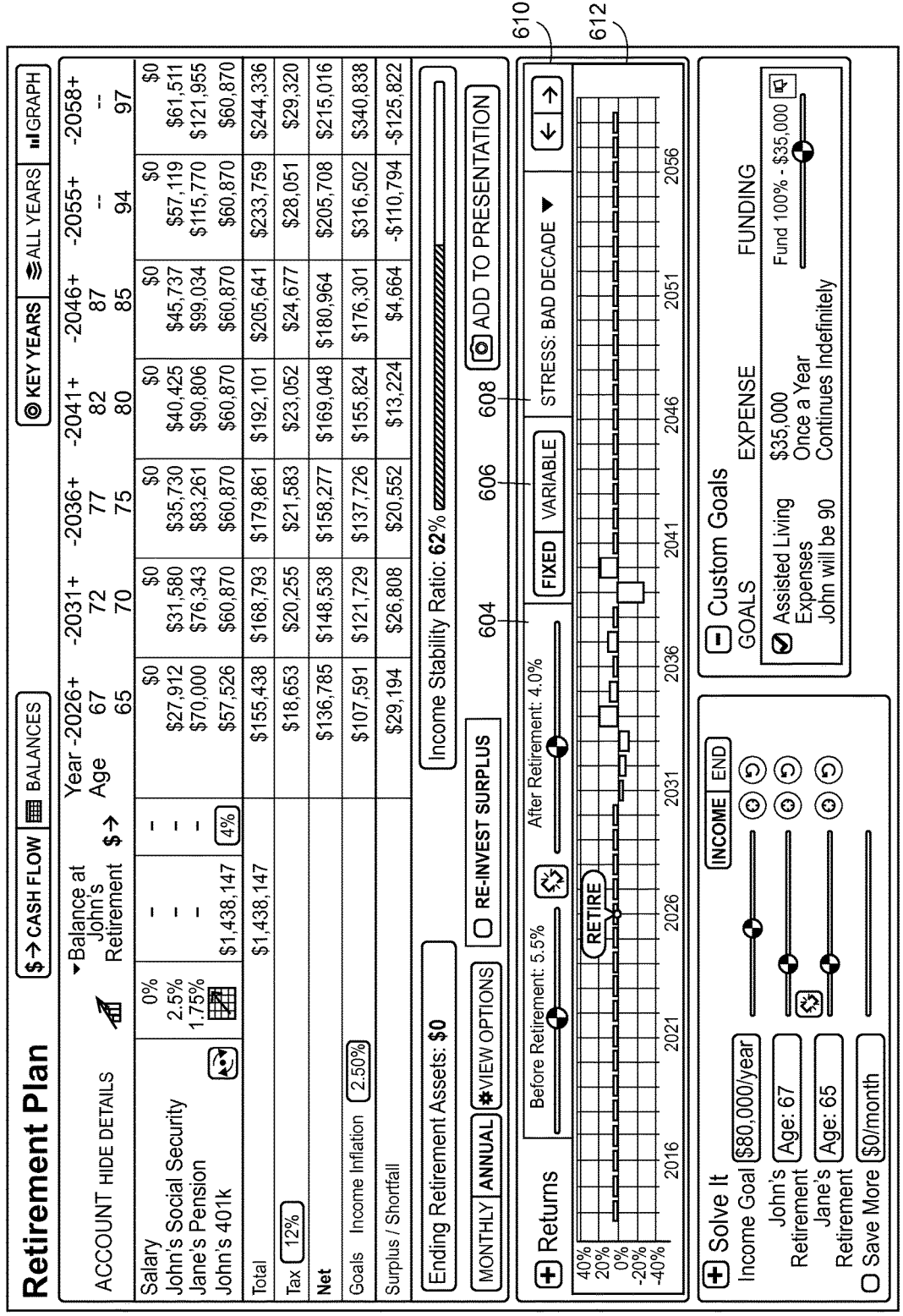

Returning to FIG. 6B, the stress test options 608 allow the user to test the sensitivity or robustness of the retirement plan to positive or negative variations in market returns. The stress test options 608 may include one or more of the following market events: a single-year reduction in the rate of return on at least one asset, a multi-year reduction in the rate of return on at least one asset, a single-year reduction in the value of at least one asset, a multi-year reduction in the value of at least one asset, or a multi-year series of changes to the rate of return that includes at least one increase in the value of at least one asset and at least one decrease in the value of at least one asset. For example, FIG. 6D illustrates a selection of the stress test options 608 relating to a bad decade preceding retirement, in which four years have negative rates of return and six years have positive rates of return that fail to offset the years with negative rates of return. Because timing of market fluctuations affects returns, the timing options 610 allow the user to adjust the timing of the market fluctuations. FIG. 6E illustrates the stress test selection of FIG. 6D adjusted to begin after retirement by using the timing options 610.

Figure 6F:
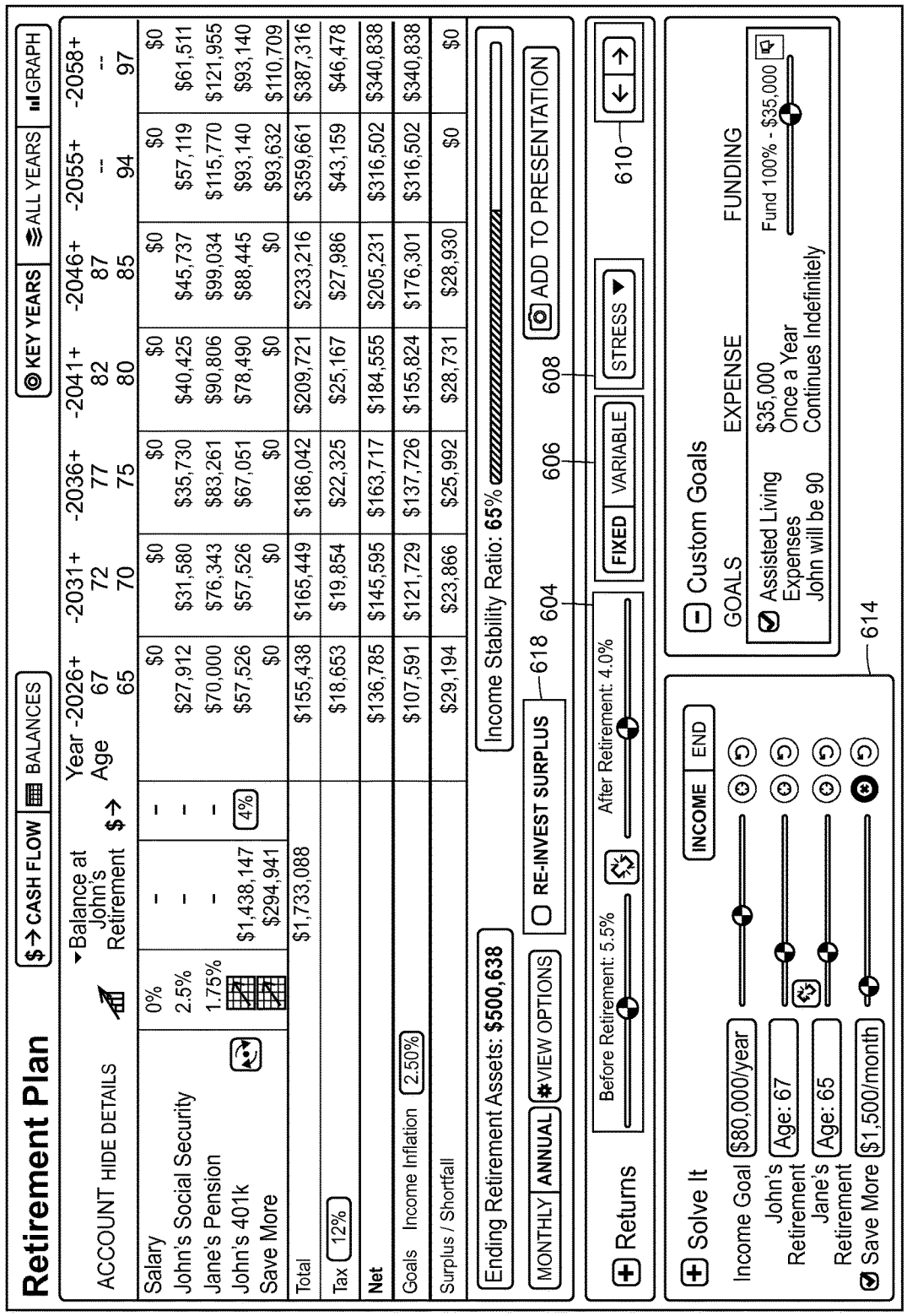

Returning to FIG. 6A, the options may include optimization options 614 allowing a user to adjust one or more parameters associated with each option such that any difference between the retirement income goal and the projected income (i.e., a surplus or shortfall) is minimized. The difference may be minimized for each year during the retirement period, or the difference may be minimized for the final year. Alternatively, the optimization options 614 may make the minimal adjustments to the parameters that eliminate any shortfalls in any year during the retirement period. The optimization options 610 may be associated with parameters such as the client's retirement income goal, the client's retirement age, the client's spouse's retirement age, additional savings before retirement, or other similar parameters. In some embodiments, the optimization options 614 may be constrained by other parameters or client information. For example, an optimization option associated with additional savings before retirement may be limited by information relating to the client's income and expenses. FIG. 6F illustrates the exemplary display of the retirement plan where the optimization option 614 associated with a rate of additional savings before retirement is selected. The optimized additional monthly savings indicates the additional amount the client would need to save each month before retirement to have no shortfalls during the retirement period.

Figure 6G:
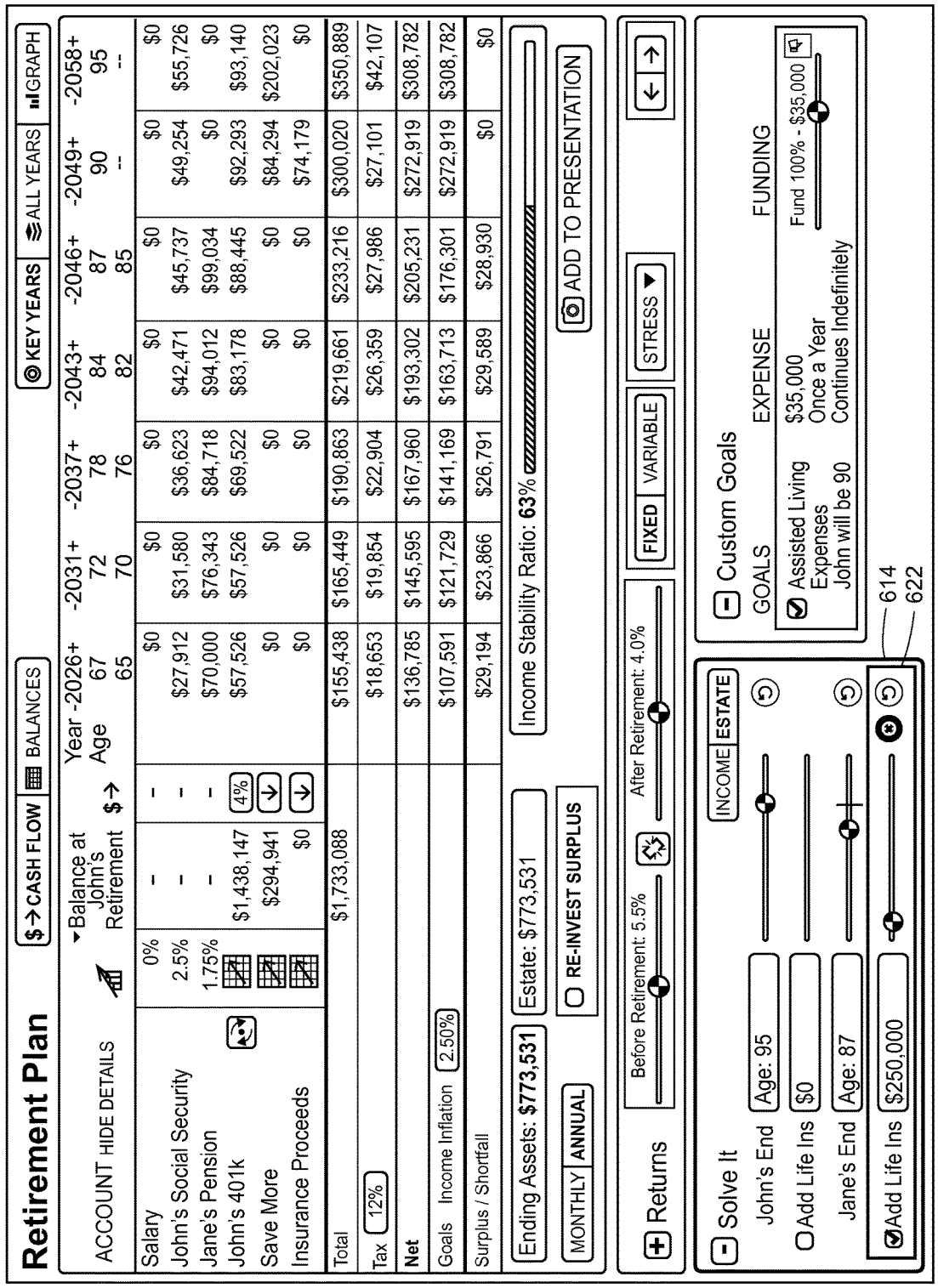

In some embodiments, the optimization options 614 may further relate to estate planning, as illustrated in FIG. 6G. In such embodiments, the options may be associated with parameters such as anticipated life expectancy or age at death, as well as life insurance coverage. Additional parameters or options may further relate to the type and amount of life insurance coverage. Using sliders or other means, the user may adjust the values of the parameters associated with the optimization options 614. For example, the value of the parameter associated with life expectancy may be adjusted to project changes to the retirement plan values if one or both clients were to live shorter or longer lives. If the client or clients live longer lives, they may need to increase the amount saved, delay retirement, or reduce expenditures during retirement to avoid a shortfall during their final years. On the other hand, if one client dies at an earlier age than expected, the loss of income from sources associated with that client (e.g., pension benefits or Social Security benefits) may result in a shortfall for a surviving spouse. FIG. 6G shows an adjustment by the user to a parameter associated with the optimization options 614 that would result in a shortfall during the final years of the retirement plan. To counteract such shortfall, the user may further select an insurance option 622 to add a life insurance policy. The user may select an optimization option 614 associated with a life insurance policy to determine the appropriate type or level of insurance to minimize the shortfall. FIG. 6G illustrates the effects upon the retirement plan of an earlier death of a client, coupled with an offsetting life insurance policy.

Figure 6H:
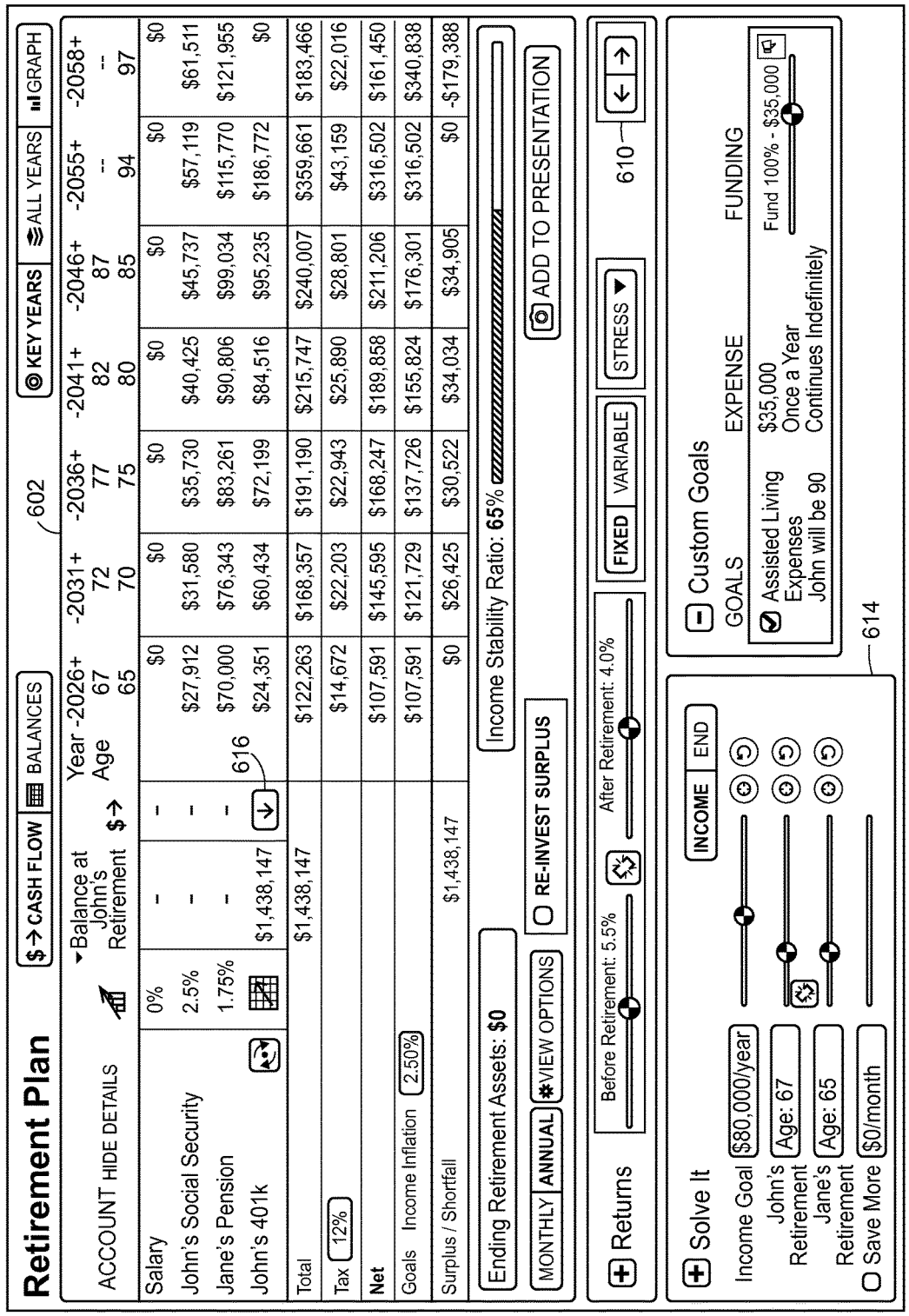

Returning again to FIG. 6A, the options may include a drawdown option 616 for some assets. The drawdown option 616 adjusts the parameters to withdraw from the associated asset only the minimum amount necessary to avoid an income shortfall in each year during the retirement period. When selected, the total amount of withdrawals (if any) from the asset in each year during retirement will be the lowest amount required for the projected net income to meet or exceed the client's retirement income goals for that year. Compared with a fixed percentage withdrawal, the drawdown option 616 may cause the retirement plan to withdraw more (if a shortfall would otherwise occur) or less (if a surplus would otherwise occur) than the fixed percentage in any year. FIG. 6H illustrates the exemplary display of the retirement plan where the drawdown option 616 is selected. In the column labeled "2055" of the tabular block 602, the selection of the drawdown option 616 has eliminated the $82,396 shortfall, but the selection of the drawdown option 616 has also increased the shortfall from $97,424 to $179,388 in the column labeled "2058" by fully depleting the asset.

Figure 6I:
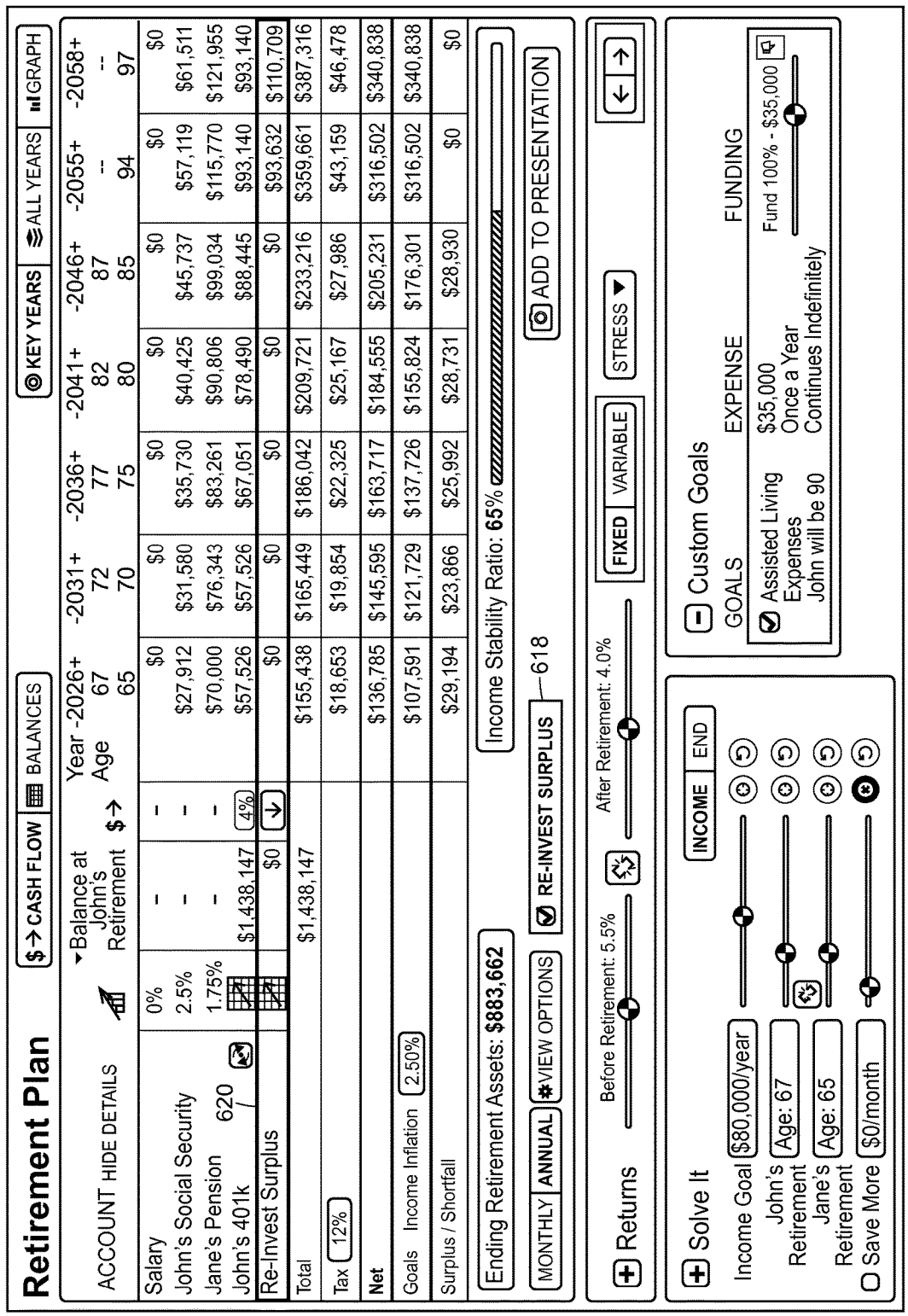

Returning again to FIG. 6A, the options may further include a reinvestment option 618 that reinvests any surplus of projected retirement income above the client's retirement income goals for future use. This parameter may cause a more reasonable retirement plan to be determined, particularly where large surpluses shortly after retirement and shortfalls later in the retirement period exist. FIG. 6I illustrates the exemplary display of the retirement plan where the reinvestment option 618 is selected. Selecting the reinvestment option 618 causes the retirement plan to place any surplus into a reinvestment asset 620. No income is withdrawn from the reinvestment asset 620 until it is necessary to avoid a shortfall.

At block 512, the controller 916 may determine whether a request to end the method 500 has been received. If no such request has been received, the method continues until either a request to end has been received or a user selection of an option to adjust a parameter has been received.

At block 514, the controller 916 may receive a selection of at least one or the plurality of options to adjust or change the parameters presented to the user at block 510. Selection of one or more options to adjust or change the parameters may be received from the user, as indicated above. Upon receiving an indication of a selection to change or adjust a parameter, the controller 916 may adjust the parameters, determine a new retirement plan, and present the new retirement plan to the user.

At block 516, the controller may adjust one or more parameters based upon the selection received at block 514. Where a change in one parameter affects another parameter, more than one parameter may be adjusted. For example, the retirement ages of the client and the client's spouse may be linked, such that a change in the retirement age of one causes a change in the retirement age of the other. As another example, the stress test options 608 may cause an adjustment to the parameters for the rates of return in multiple years, as shown in FIGS. 6D-6E.

At block 518, the controller 916 may determine a new retirement plan based upon the client information and the adjusted parameters. This determination may be made in real-time (i.e., without noticeable delay between the user selection and the display of the new retirement plan), such that the user may easily compare the impacts of various changes to the parameters. This may be achieved by processing the received selection of an option to adjust or change the parameters on the computing device 910. Where the method 500 is implemented in an internet browser, for example, the server 940 may initially send a script or other executable code to be run on the computing device 910 at or before the method 500 starts. The script may then be executed by the computing device 910 without further instructions from the server 940, or the script may request instructions from the server 940 as necessary. In order to improve the speed at which adjustments or changes may be made and displayed, however, the script may contain all instructions necessary to determine and present retirement plans based upon the client information and parameters. By incorporating the instructions necessary for the controller 916 to determine retirement plans without reference to resources external to the computing device 910, the time required to change or adjustment parameters and determine a new retirement plan may be reduced. This results from the elimination of the communication lag inherent in transmitting data over a network to a server or other device, then waiting to receive a response over the network from the server or other device. In some embodiments, however, the communication lag may be considered acceptable, and the new retirement plan may be determined by the server 940.

In some embodiments, determining the new retirement plan may include determining, by the controller 916 of the computing device 910, the new retirement plan without receiving additional information from any additional computing devices communicatively connected to the computing device 910 after receiving an indication of a parameter change, such as a selection by the user of one or more of the plurality of options for changing or adjusting the parameters.

In further embodiments, determining the new retirement plan may include determining, by the controller 916 of the computing device 910, the new retirement plan without requesting additional information from any additional computing devices communicatively connected to the computing device 910 after receiving an indication of a parameter change. Specifically, the new retirement plan may be determined without communication between the computing device 910 and the server 940 (via the network 930 or otherwise) after the computing device 910 receives a selection of at least one of the plurality of options to change or adjust the parameters. In some such embodiments, however, the computing device 910 may nonetheless receive information from the server 940 via the network 930 prior to receiving a selection from the user or after determining the new retirement plan. The computing device 910 may also communicate the received selection or the adjusted parameters to the server 940 at any time in such embodiments.

At block 520, the controller 916 may present or cause the new retirement plan to be presented to the user by the display 912 or other means. As noted above, the new retirement plan may be determined and presented in real-time, immediately upon the user's selection of one or more of the plurality of options to change or adjust the parameters. It should be understood that smoothing transitions may be used to present a pleasing visual effect while still presenting the new retirement plan in real-time. For example, the heights of several bars in a chart may be presented as rising or falling to new values over the course of a discernible period of time (e.g., half a second, one second, two seconds, etc.) in response to the user selecting an option to adjust a parameter. Additionally, the layout and presentation options may remain unchanged for presentation of the new retirement plan or may be reset to default settings.

At block 522, the adjusted parameters from block 516 may be stored in the program memory 922 or transmitted to the server 940 for storage in the program memory 960 or the database 946. Additional client information or the layout or presentation options may also be stored in program memories 922 or 960 or in the database 946 for future use. In some embodiments, the adjusted parameters may be stored in the program memory 922 and asynchronously communicated to the server 940 via the network 930, such as during a periodic update.

The method 500 then continues at block 510 with presentation of a plurality of options to change or adjust the parameters, as described above. When a request to end the method 500 is determined to have been received at block 512, the method 500 may terminate. The request to end may be generated by a user or automatically determined (e.g., a session time-out after a period of inactivity).

Figure 7:
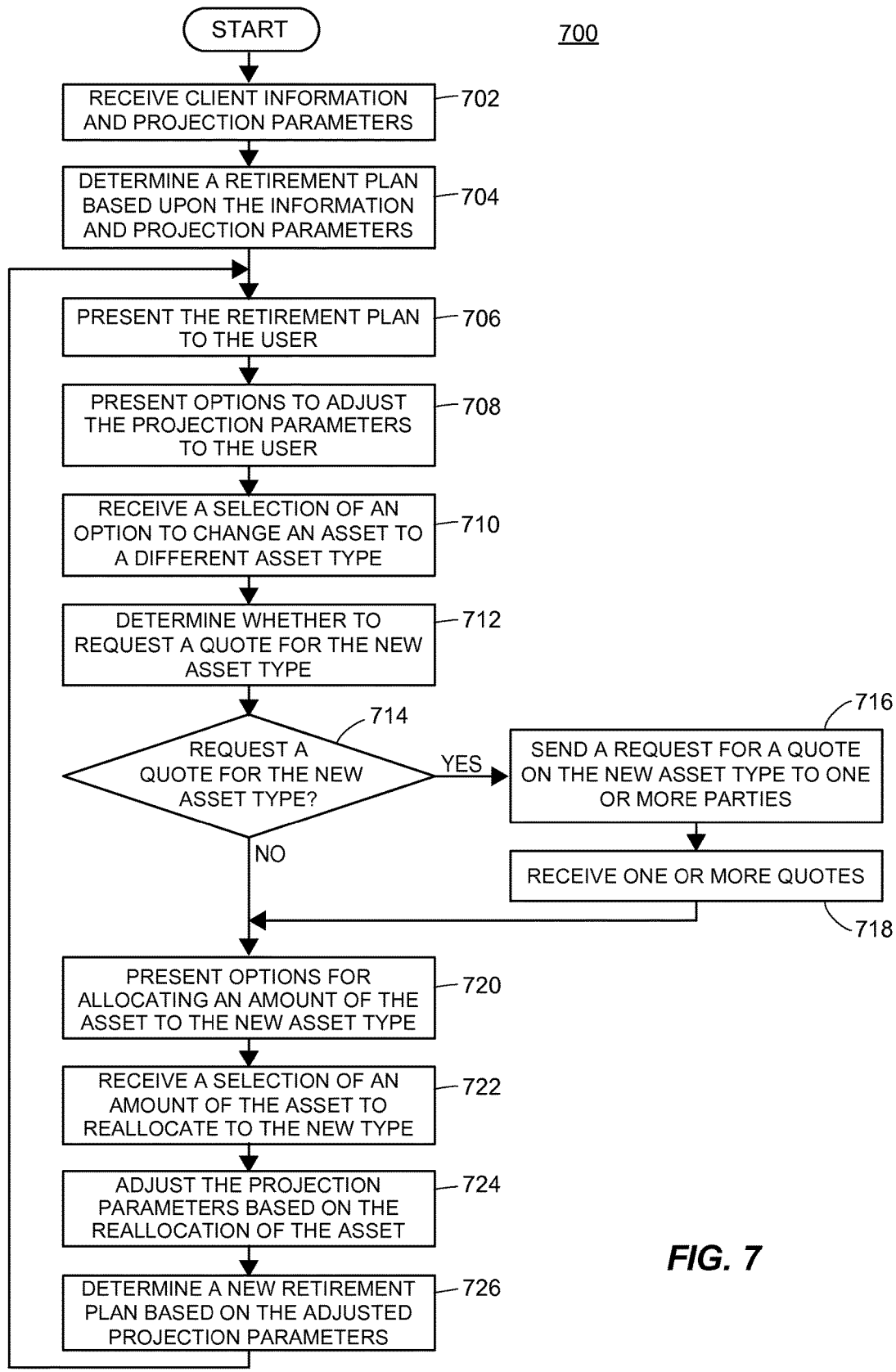
FIG. 7 illustrates a flow chart of an exemplary asset reallocation method for reallocating part or all of an asset to a different type of asset.

FIG. 7 illustrates a flow chart of an exemplary asset reallocation method 700 for reallocating part or all of an asset to a different type of asset. As above, the method 700 receives client information and parameters, determines a retirement plan, and presents the retirement plan and a plurality of options to adjust the parameters. At least one of the options to adjust the parameters is an option to reallocate funds from an asset of one type to an asset of another type for purposes of determining a new retirement plan. For example, the new retirement plan may project retirement income under a scenario where stock in a retirement account would be sold and the value funds used to purchase a variable annuity. It should be understood that any references to "reallocation" of assets or funds refers to a change of parameters to project a hypothetical reallocation of assets or funds, regardless of whether the client acts upon the projections to transfer funds between actual assets. Some embodiments may include one or more options to reallocate assets to a type of asset for which a quote may be necessary or desirable. In some such embodiments, a request for a quote on a new type of asset may be generated and transmitted to parties engaged in the business of selling or administering such assets, and one or more quotes may be returned and used in determining the new retirement plan.

Figure 8A:
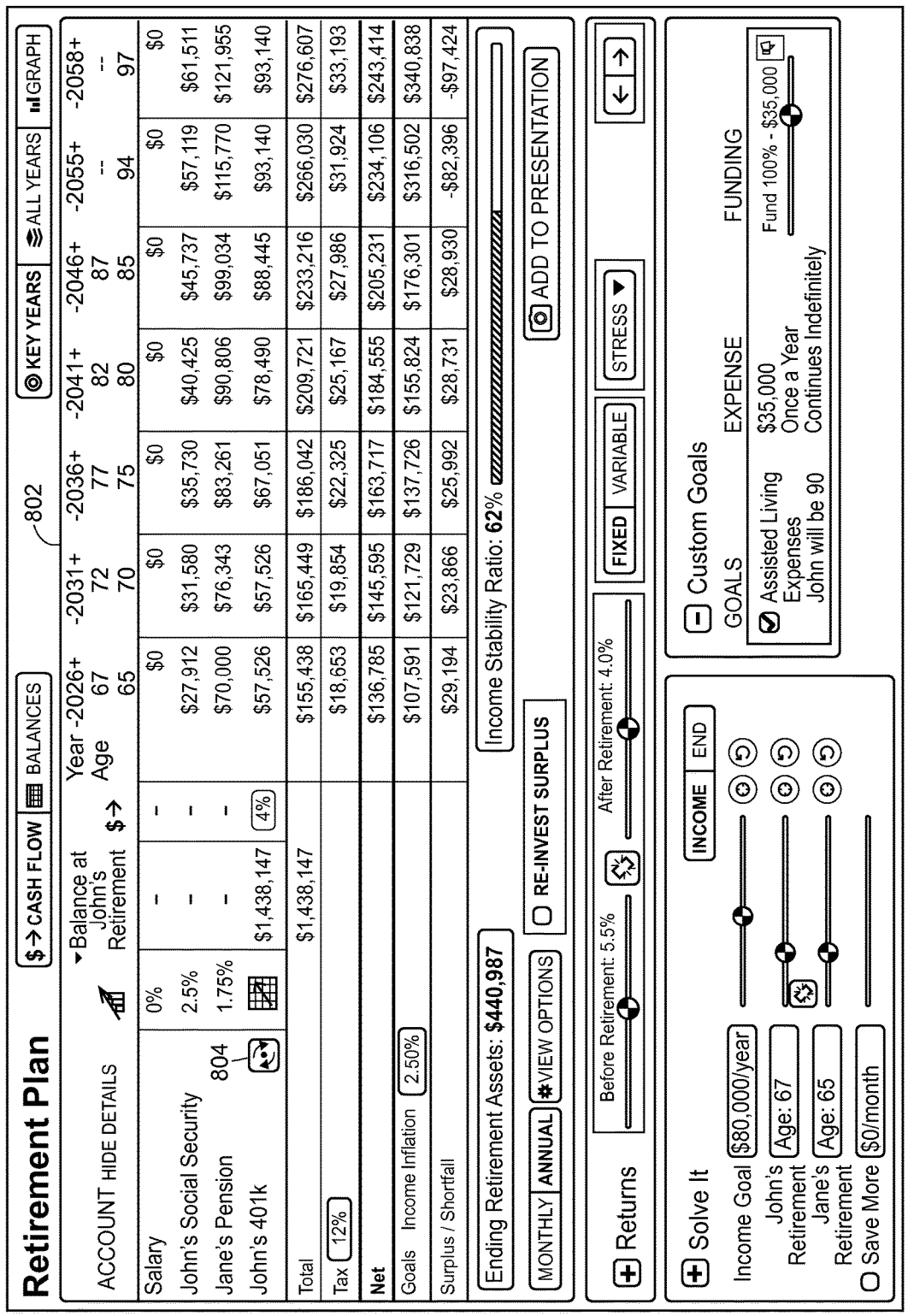
FIG. 8A-C illustrate screenshots of an exemplary presentation of a retirement plan, showing the reallocation of part or all of an asset.

At block 702, the controller 916 may receive client information and parameters relating to a retirement plan, as described above. Also as described above, the controller 916 may then determine a retirement plan at block 704 and present the retirement plan to the user via a display or other means at block 706. At block 708, the controller 916 may also present a plurality of options to adjust or change the parameters to the user, such that the plurality of options are presented simultaneously with the retirement plan, as described above. In a preferred embodiment, the plurality of options are presented within the same window as the retirement plan information, such that the user may select one or more of the options to change or adjust the parameters without hiding or obscuring the displayed retirement plan information, thereby allowing real-time adjustment of the retirement plan. At least one of the options to adjust or change the parameters may be an option to reallocate part or all of one or more assets to another type of asset. FIG. 8A illustrates a screenshot of an exemplary presentation of a retirement plan, which includes a tabular block 802 containing information regarding the retirement plan and a reallocation option 804.

Figure 8B:
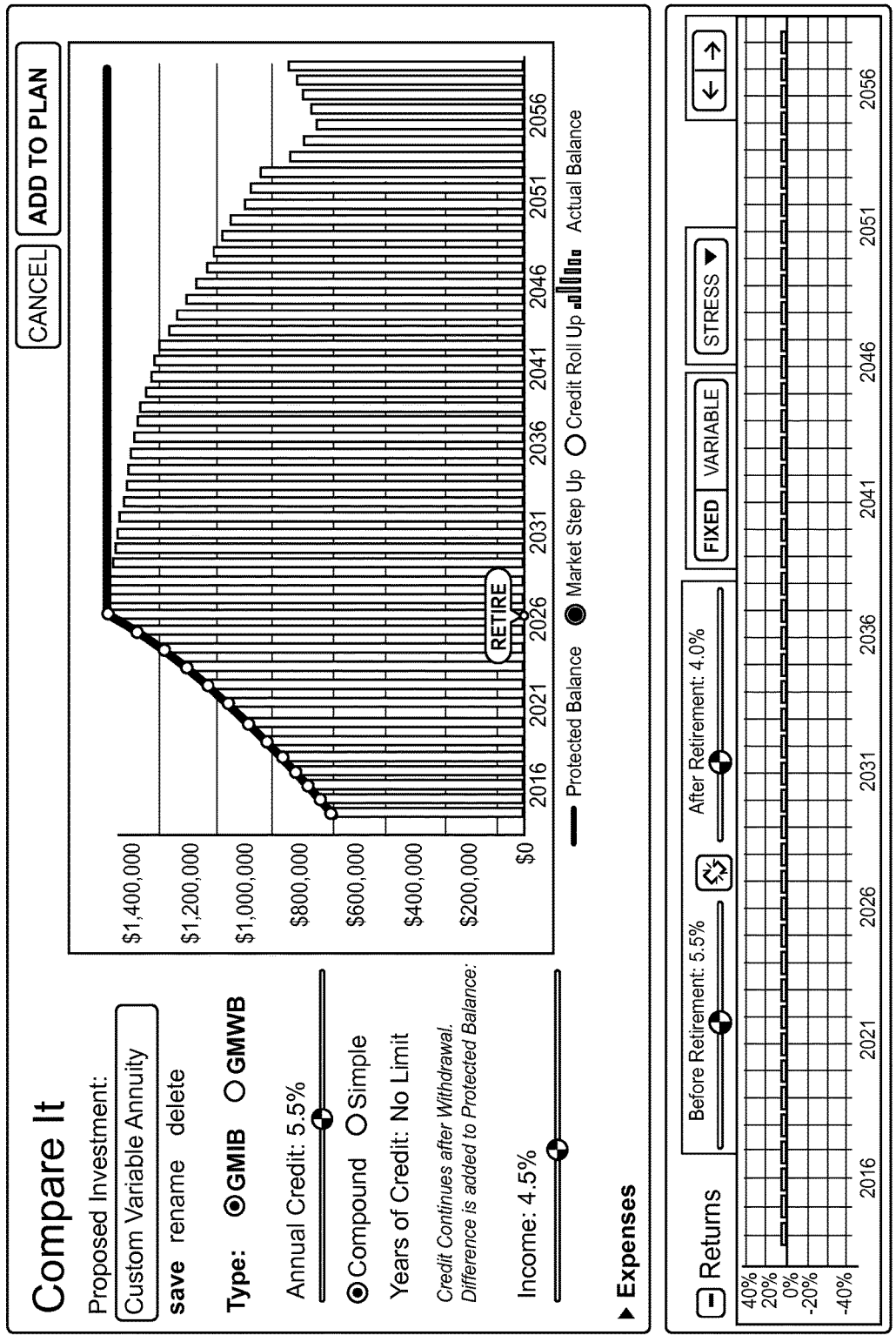

At block 710, the controller 916 may receive a selection of one or more options to reallocate part or all of at least one asset to a different type of asset. This may include changing the asset type to a higher-return asset or to a lower-risk asset. In some embodiments, the controller 916 may further cause additional options relating to available asset types to which the value of the selected asset may be reallocation, and the user may select or verify further details relating to the available asset types. FIG. 8B illustrates a screenshot of an exemplary display of such additional options presented to the user upon selection of the reallocation option 804. Upon entry, adjustment, or verification of the parameters relating to the additional options, the method 700 may continue at block 712.

At block 712, the controller 916 may determine whether to request a quote for the selected new type of asset. Although some asset types are simple financial products, others may be more complex and may vary considerably in their terms. For example, a variable annuity may involve an annual credit, which may be either compound or simple. The credit may further be limited to a set number of years or may have no such limit, as shown in FIG. 8B. The terms of complex financial products such as variable annuities may, therefore, fluctuate significantly. The controller 916 may determine that a quote should be requested for the selected new asset type. In some embodiments, the controller 916 may further prompt the user to authorize the request of a quote from one or more parties or may prompt the user for additional information.

When it has been determined at block 714 that no quotes should be requested, the method 700 continues at block 720. When it has been determined that a quote should be requested at block 714, the controller 916 may send a request for a quote via the network 930 to one or more parties engaged in the business of providing financial products of the new asset type. For example, requests for quotes on a variable annuity may be transmitted to a plurality of insurers, brokers, or representatives. The request may be standardized to allow an automated response based upon the transmitted information. At block 718, the controller 916 may then receive one or more quotes for the new asset type. If no quote is received after a predetermined period, the controller 916 may attempt to retransmit the request to the unresponsive party in some embodiments. Once all quotes have been received or the controller 916 has determined that a threshold time for responding has passed, the method 700 may continue at block 720. When no quotes are received, default values may be used for the purpose of reallocating the asset to the new type of asset. When more than one quote is received at block 718, the microprocessor 920 may select the most favorable quote to proceed. Alternatively, the microprocessor 920 may cause a plurality of quotes to be presented to the user for selection of one or more of the received quotes. As a further alternative, all received quotes may be presented to the user as alternative new assets for reallocation of the asset at block 720.

Figure 8C:
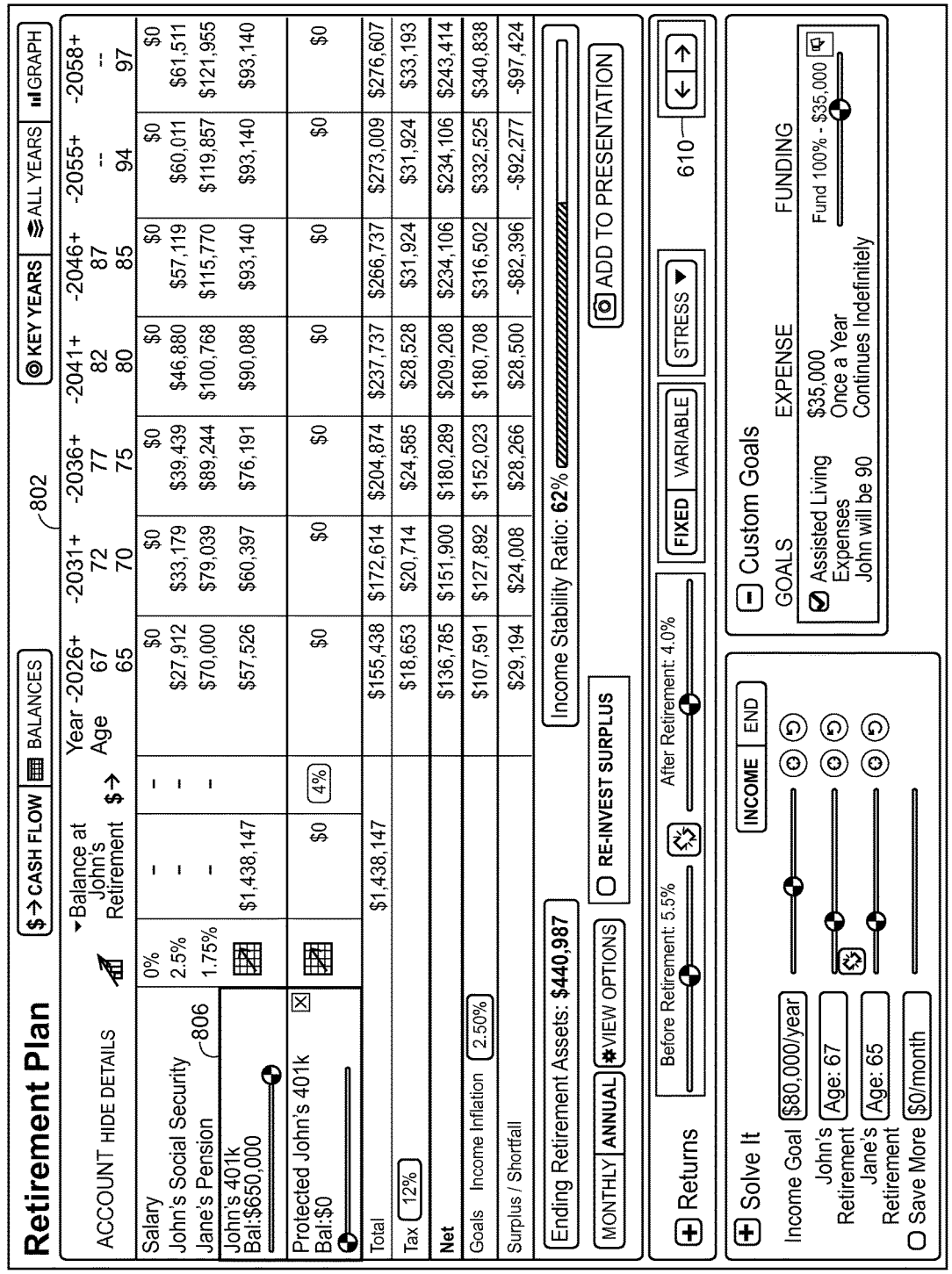

At block 720, one or more distribution options for reallocating an amount of the asset to the one or more new assets may be presented to the user via the display 912 or by other means. The distribution options may include predetermined reallocation distributions (e.g., full reallocation, reallocation of half the current value of the asset, reallocation of at least a minimum value from the asset to the new asset, etc.). Alternatively, the distribution options may allow the user to reallocate any amount to each of the one or more new assets. FIG. 8C illustrates a screenshot of exemplary distribution options 806 for reallocating part or all of the value of the asset. The distribution options 806 are illustrated as sliders, which are logically connected such that a change in the value of one of the sliders necessarily creates a counterbalancing change in the other. Thus, the total amount allocated between the asset and the new asset using the distribution options 806 remains constant.

At block 722, the controller 916 may receive a selection of an amount of the asset to reallocate to the new asset type. This may occur when the user adjusts the allocation using the presented distribution options, such as by operating the sliders of the distribution options 806.

At block 724, the controller 916 may adjust the parameters based upon the selected reallocation of value from the asset to the new asset. The adjusted parameters may then be used in determining a new retirement plan at block 726, in the manner described above. The new retirement plan may then be presented to the user at block 706, as described above. The user may then continue to select options for adjusting or changing the parameters according to the method 700, as previously described.

Figure 9:
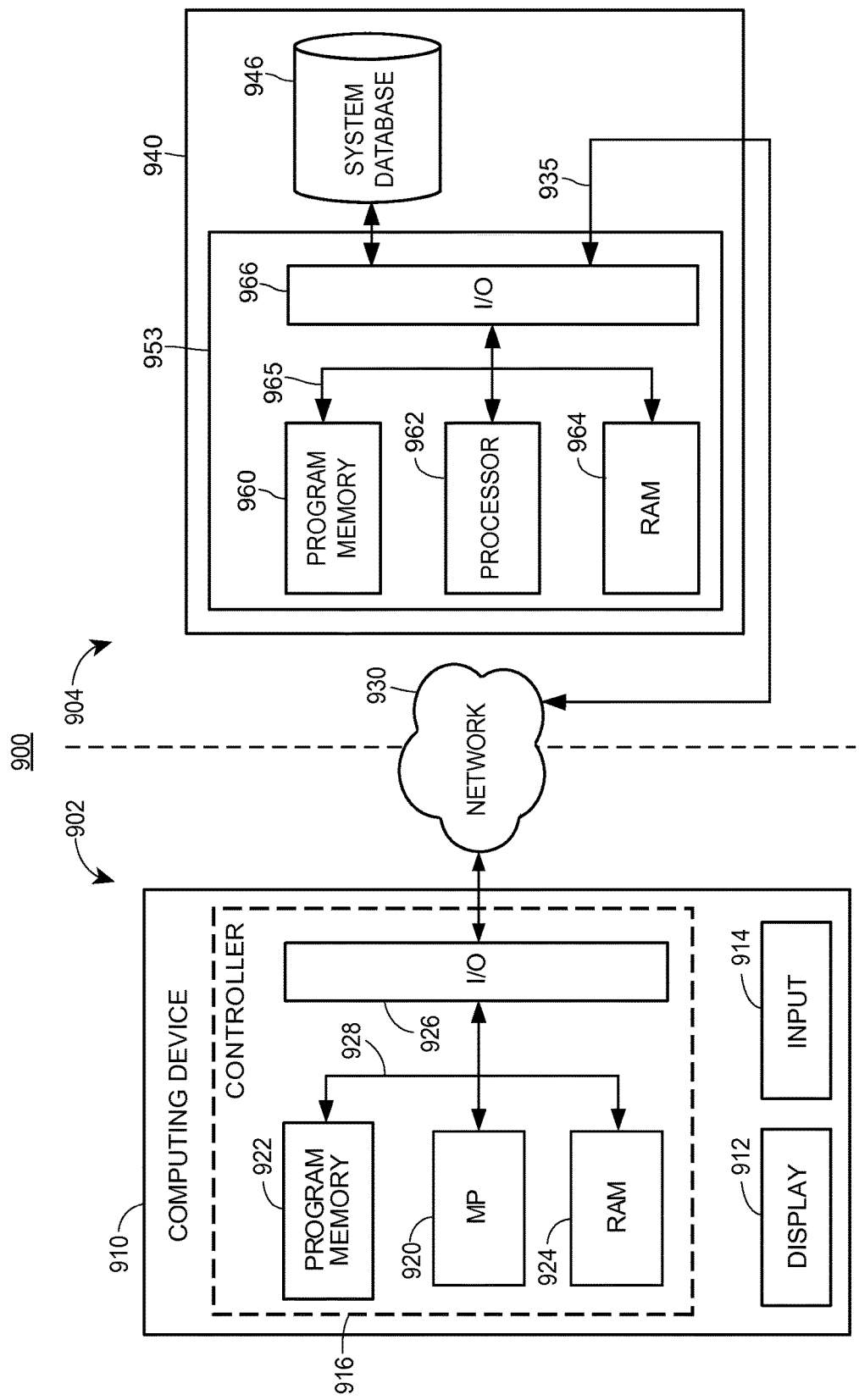
FIG. 9 illustrates a retirement plan generation and optimization system for implementing the methods as described herein.

FIG. 9 illustrates a retirement plan generation and optimization system 900 for implementing the methods as described herein. The system 900 includes front end components 902 and back end components 904, communicatively connected through a network 930. The front end components may be disposed within a computing device 910 operated by a user, and the back end components 904 may be disposed within one or more servers 940. Each server 940 may further include or be communicatively connected to one or more databases 946.

The computing device 910 may include a display 912, an input 914, and a controller 916. The input 914 may include a "soft" keyboard that is displayed on the display 912 of the computing device 910, an external hardware keyboard communicating via a wired or a wireless connection (e.g., a Bluetooth keyboard), an external mouse, or any other suitable user-input device. The controller 916 includes one or more microcontrollers or microprocessors (MP) 920, a program memory 922, a RAM 924, and an I/O circuit 926, all of which are interconnected via an address/data bus 928. The program memory 922 may include an operating system, a data storage, a plurality of software applications, and a plurality of software routines. As discussed above, the program memory 922 may include software applications, routines, or scripts for implementing the methods 200, 300, 500, or 700. In some embodiments, the controller 916 may also include, or otherwise be communicatively connected to, other data storage mechanisms (e.g., one or more hard disk drives, optical storage drives, solid state storage devices, etc.) that reside within the computing device 910. It should be appreciated that although FIG. 9 depicts only one microprocessor 920, the controller 916 may include multiple microprocessors 920. Similarly, the memory of the controller 916 may include multiple program memories 922 or multiple RAMs 924. Although the FIG. 9 depicts the I/O circuit 926 as a single block, the I/O circuit 926 may include a number of different types of I/O circuits. The controller 916 may implement the program memories 922 or the RAMs 924 as semiconductor memories, magnetically readable memories, or optically readable memories, for example.

In some embodiments, the front-end components 902 may communicate with the back-end components 904 via the network 930. The network 930 may be a proprietary network, a secure public internet, a virtual private network or some other type of network, such as dedicated access lines, plain ordinary telephone lines, satellite links, cellular data networks, combinations of these, etc. Where the network 930 comprises the Internet, data communications may take place over the network 930 via an Internet communication protocol.

The back-end components 904 may include one or more servers 940. Each server 940 may include one or more processors 962 adapted and configured to execute various software applications and components of the system 900, in addition to other software applications. The server 940 may further include a database 946, which may be adapted to store data related to the system 900, such as client information and parameters for a plurality of clients uploaded to the server 940 via the network 930. The server 940 may access data stored in the database 946 upon receiving a request for data from the computing device 910. The server 940 may have a controller 955 that is operatively connected to the database 946 via a link 956. It should be noted that, while not shown, additional databases may be linked to the controller 955 in a known manner. The controller 955 may include a program memory 960, a processor 962, a RAM 964, and an I/O circuit 966, all of which may be interconnected via an address/data bus 965. As with the controller 916, it should be appreciated that although only one microprocessor 962 is shown, the controller 955 may include multiple microprocessors 962. Similarly, the memory of the controller 955 may include multiple RAMs 964 and multiple program memories 960. Although the I/O circuit 966 is shown as a single block, it should be appreciated that the I/O circuit 966 may include a number of different types of I/O circuits. The RAM 964 and program memories 960 may be implemented as semiconductor memories, magnetically readable memories, or optically readable memories, for example. The controller 955 may also be operatively connected to the network 930 via a link 935. The server 940 may further include a number of software applications stored in a program memory 960. The various software applications may include a web server application responsible for generating data content to be included in web pages sent from the server 940 to the computing device 910.

Although the description herein contained may refer to a client and a user or advisor, it should further be understood that the client may operate the system and methods described herein without the aid of an advisor in some embodiments, in which case the client and user may be the same person.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as exemplary only and does not describe every possible embodiment, as describing every possible embodiment would be impractical, if not impossible. One could implement numerous alternate embodiments, using either current technology or technology developed after the filing date of this application.

What is claimed is:

1. A computer-implemented method for generating and adjusting retirement plans for a client, comprising:
    receiving, at one or more processors, client information, including information related to a plurality of parameters for projecting future values associated with the retirement plans;
    determining, by one or more processors, a first retirement plan based upon the received client information;
    presenting, by a display, information regarding the first retirement plan to a user in a first portion of a display window;
    presenting, by the display, a plurality of options to change at least a portion of the plurality of parameters in a second portion of the display window, wherein the plurality of options are displayed to the user simultaneously with the information regarding the first retirement plan and wherein the plurality of options includes (i) a stress test option associated with a change to at least one of the plurality of parameters in one or more future time periods to simulate one or more market events associated with at least one asset, and (ii) one or more options to adjust the timing of occurrence of the one or more market events;
    receiving, by one or more processors, an indication of a parameter change, wherein the parameter change includes a selection of at least one of the plurality of options to change at least a portion of the plurality of parameters, wherein the selection indicates at least one of the one or more market events associated with the stress test option;
    determining, by one or more processors in real-time in response to receiving the indication of the parameter change, a second retirement plan based upon the client information and the indication of the parameter change, including simulating the indicated at least one of the one or more market events by changing the at least one of the plurality of parameters in the one or more future time periods; and
    presenting, by the display, information regarding the second retirement plan to the user simultaneously with a second plurality of options to change at least a portion of the plurality of parameters in the first portion of the display window by replacing at least a portion of the information regarding the first retirement plan.

2. The computer-implemented method of claim 1, wherein each of the information regarding the first retirement plan and the information regarding the second retirement plan include a projection of at least one of the following: retirement income from one or more sources during retirement, expenses during retirement, retirement age, rate of return on investments, rate of return on other assets, length of client life, healthcare expenses, recurring expenses, nonrecurring expenses.

3. The computer-implemented method of claim 1, wherein the client information includes a first item of client information and a second item of client information, and wherein the second item is prepopulated with a default value based at least in part upon the received value of the first item.

4. The computer-implemented method of claim 1, wherein determining the second retirement plan includes determining, by a processor of a computing device operated by the user, the second retirement plan without receiving additional information from any additional computing devices communicatively connected to the computing device after receiving the indication of the parameter change.

5. The computer-implemented method of claim 1, wherein the one or more market events include one or more of the following: a single-year reduction in a rate of return on the at least one asset, a multi-year reduction in the rate of return on the at least one asset, a single-year reduction in a value of the at least one asset, a multi-year reduction in the value of the at least one asset, or a multi-year series of changes to the rate of return that includes at least one increase in the value of the at least one asset and at least one decrease in the value of the at least one asset.

6. The computer-implemented method of claim 1, wherein receiving the indication of the parameter change comprises receiving a selection of a reallocation option to reallocate part or all of at least one asset of the assets of the client to a different type of asset in the second retirement plan.

7. The computer-implemented method of claim 6, wherein:
    receiving the selection of the reallocation option includes receiving a selection to reallocate part or all of the at least one asset of the client to an annuity;
    the computer-implemented method further comprises: transmitting, via a network, a request for one or more quotes for the annuity to one or more parties, and receiving, via the network, one or more quotes from the one or more parties; and
    the second retirement plan is determined based at least in part upon the received one or more quotes from the one or more parties.

8. The computer-implemented method of claim 1, wherein the plurality of options to change at least a portion of the plurality of parameters includes a drawdown option, wherein selection of the drawdown option causes the second retirement plan to include a sufficient withdrawal of an asset in each period following the client's retirement to meet the client's retirement income goals in each of one or more periods following the client's retirement until the asset is depleted.

9. The computer-implemented method of claim 1, wherein the plurality of options to change at least a portion of the plurality of parameters includes at least one optimization option associated with one or more of the plurality of parameters, wherein selection of the optimization option causes an adjustment to the associated one or more parameters in the second retirement plan such that the difference between the client's retirement income goal and projected retirement income is minimized.

10. The computer-implemented method of claim 1, wherein presenting the first retirement plan to the user and presenting the second retirement plan to the user each include presenting a presentation option to the user, and further comprising:
receiving, by one or more processors, a selection of the presentation option;
determining, by one or more processors, at least one slide based upon a retirement plan associated with the selected presentation option; and
generating, by one or more processors, a slide presentation include the one or more determined slides.

11. A computer system for generating and adjusting retirement plans for a client, comprising:
one or more processors;
a non-transitory program memory storing executable instructions that when executed by the one or more processors cause the computer system to:
receive client information, including information related to a plurality of parameters for projecting future values associated with the retirement plans;
determine a first retirement plan based upon the received client information;
present information regarding the first retirement plan to a user in a first portion of a display window;
present a plurality of options to change at least a portion of the plurality of parameters in a second portion of the display window, wherein the plurality of options are displayed to the user simultaneously with the information regarding the first retirement plan and wherein the plurality of options includes (i) a stress test option associated with a change to at least one of the plurality of parameters in one or more future time periods to simulate one or more market events associated with at least one asset, and (ii) one or more options to adjust the timing of occurrence of the one or more market events;
receive an indication of a parameter change, wherein the parameter change includes a selection of at least one of the plurality of options to change at least a portion of the plurality of parameters, wherein the selection indicates at least one of the one or more market events associated with the stress test option;
determine, in real-time in response to receiving the indication of the parameter change, a second retirement plan based upon the client information and the indication of the parameter change, including simulating the indicated at least one of the one or more market events by changing the at least one of the plurality of parameters in the one or more future time periods; and
present information regarding the second retirement plan to the user simultaneously with a second plurality of options to change at least a portion of the plurality of parameters in the first portion of the display window by replacing at least a portion of the information regarding the first retirement plan.

12. The computer system of claim 11, wherein the client information includes a first item of client information and a second item of client information, and wherein the second item is prepopulated with a default value based at least in part upon the received value of the first item.

13. The computer system of claim 11, wherein:
the one or more processors are disposed within a computing device operated by the user; and
the executable instructions that when executed by the one or more processors cause the computer system to determine the second retirement plan further cause the computing device to determine the second retirement plan without receiving additional information from any additional computing devices communicatively connected to the computing device after receiving the indication of the parameter change.

14. The computer system of claim 11,
wherein the one or more market events include one or more of the following: a single-year reduction in a rate of return on the at least one asset, a multi-year reduction in the rate of return on the at least one asset, a single-year reduction in a value of the at least one asset, a multi-year reduction in the value of the at least one asset, or a multi-year series of changes to the rate of return that includes at least one increase in the value of the at least one asset and at least one decrease in the value of the at least one asset.

15. The computer system of claim 11, wherein:
the indication of the parameter change includes a reallocation option to reallocate part or all of at least one asset of the assets of the client to an annuity in the second retirement plan;
the computer system further comprises one or more servers communicatively connected to the one or more processors through a network;
the executable instructions further comprise executable instructions that when executed by the one or more processors cause the computer system to transmit to the one or more servers a request for one or more quotes for the annuity and receive from the one or more servers one or more quotes; and
the second retirement plan is determined based at least in part upon the received one or more quotes.

16. A tangible, non-transitory computer-readable medium storing executable instructions for generating and adjusting retirement plans for a client, which executable instructions, when executed by one or more processors of a computer system, cause the computer system to:
receive client information, including information related to a plurality of parameters for projecting future values associated with the retirement plans;
determine a first retirement plan based upon the received client information;
present information regarding the first retirement plan to a user in a first portion of a display window;
present a plurality of options to change at least a portion of the plurality of parameters in a second portion of the display window, wherein the plurality of options are displayed to the user simultaneously with the information regarding the first retirement plan and wherein the plurality of options includes (i) a stress test option associated with a change to at least one of the plurality of parameters in one or more future time periods to simulate one or more market events associated with at least one asset, and (ii) one or more options to adjust the timing of occurrence of the one or more market events;

receive an indication of a parameter change, wherein the parameter change includes a selection of at least one of the plurality of options to change at least a portion of the plurality of parameters, wherein the selection indicates at least one of the one or more market events associated with the stress test option;

determine, in real-time in response to receiving the indication of the parameter change, a second retirement plan based upon the client information and the indication of the parameter change, including simulating the indicated at least one of the one or more market events by changing the at least one of the plurality of parameters in the one or more future time periods; and present information regarding the second retirement plan to the user simultaneously with a second plurality of options to change at least a portion of the plurality of parameters in the first portion of the display window by replacing at least a portion of the information regarding the first retirement plan.

17. The tangible, non-transitory computer-readable medium of claim 16, wherein the client information includes a first item of client information and a second item of client information, and wherein the second item is prepopulated with a default value based at least in part upon the received value of the first item.

18. The tangible, non-transitory computer-readable medium of claim 16, wherein the executable instructions cause the computer system to determine the second retirement plan further cause the computer system to determine the second retirement plan without requesting additional information from any additional computing devices communicatively connected to the computer system after receiving the indication of the parameter change.

19. The tangible, non-transitory computer-readable medium of claim 16,
wherein the one or more market events include one or more of the following: a single-year reduction in a rate of return on the at least one asset, a multi-year reduction in the rate of return on the at least one asset, a single-year reduction in a value of the at least one asset, a multi-year reduction in the value of the at least one asset, or a multi-year series of changes to the rate of return that includes at least one increase in the value of the at least one asset and at least one decrease in the value of the at least one asset.

20. The tangible, non-transitory computer-readable medium of claim 16, wherein:
the indication of the parameter change includes a reallocation option to reallocate part or all of at least one asset of the assets of the client to an annuity in the second retirement plan;
the executable instructions further cause the computer system to transmit a request for one or more quotes for the annuity to one or more parties, and
receive one or more quotes from the one or more parties; and
the second retirement plan is determined based at least in part upon the received one or more quotes from the one or more parties.

\* \* \* \* \*